US011582759B2

(12) United States Patent
Wu et al.

(10) Patent No.: US 11,582,759 B2
(45) Date of Patent: Feb. 14, 2023

(54) METHOD AND DEVICE IN UE AND BASE STATION FOR IDENTIFYING START TIME OF TRANSMISSION USING SUBCARRIER SPACING INFORMATION USED FOR WIRELESS COMMUNICATION

(71) Applicants: Lu Wu, Shanghai (CN); Xiaobo Zhang, Shanghai (CN); Lin Yang, Shanghai (CN)

(72) Inventors: Lu Wu, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 177 days.

(21) Appl. No.: 17/016,359

(22) Filed: Sep. 9, 2020

(65) Prior Publication Data
US 2020/0413414 A1 Dec. 31, 2020

Related U.S. Application Data

(63) Continuation of application No. PCT/CN2019/122700, filed on Dec. 3, 2019.

(30) Foreign Application Priority Data

Dec. 24, 2018 (CN) .......................... 201811578513.5

(51) Int. Cl.
H04W 72/04 (2009.01)
H04L 5/00 (2006.01)
(Continued)

(52) U.S. Cl.
CPC ....... *H04W 72/0493* (2013.01); *H04L 5/0094* (2013.01); *H04W 16/14* (2013.01);
(Continued)

(58) Field of Classification Search
CPC ............. H04W 72/0493; H04W 16/14; H04W 72/042; H04W 72/0446; H04W 72/0453;
(Continued)

(56) References Cited

U.S. PATENT DOCUMENTS 9,497,053 B2   11/2016   Zhang et al.
2017/0079028 A1*  3/2017  Dinan .................... H04L 5/008
(Continued)

FOREIGN PATENT DOCUMENTS

CN   105323854 A   2/2016
CN   105763308 A   7/2016
(Continued)

OTHER PUBLICATIONS

WO 2019071624 A1 (Year: 2017).*
(Continued)

*Primary Examiner* — Ian N Moore
*Assistant Examiner* — Rushil Parimal Sampat

(57) ABSTRACT

The present disclosure provides a method and a device in a UE and a base station for wireless communications. The UE receives first information, and transmits a first radio signal in a first time window in a first sub-band. The first information is used for determining the first time window; a time offset of a start time for a transmission of the first radio signal relative to a reference time belongs to a target offset set, the target offset set including W offset value(s); time offset(s) of W start time(s) respectively relative to the reference time is(are) respectively equal to the W offset
(Continued)

value(s); any of the W start time(s) belongs to one of N time units, any of the N time units includes at least one of the W start times.

14 Claims, 19 Drawing Sheets

(51) Int. Cl.
*H04W 16/14* (2009.01)
*H04W 72/0446* (2023.01)
*H04W 72/0453* (2023.01)

(52) U.S. Cl.
CPC ..... *H04W 72/042* (2013.01); *H04W 72/0446* (2013.01); *H04W 72/0453* (2013.01)

(58) Field of Classification Search
CPC .... H04W 72/04; H04L 5/0094; H04L 1/0013; H04L 1/0068; H04L 5/0007; H04L 5/0028; H04L 5/0051; H04L 5/0053; H04L 5/0078; H04L 5/0048
See application file for complete search history.

(56) References Cited

U.S. PATENT DOCUMENTS

2019/0253292 A1* 8/2019 Abdoli ............. H04W 52/0261
2020/0245337 A1* 7/2020 Chen ................. H04W 72/0493

FOREIGN PATENT DOCUMENTS

| CN | 106961742 A | 7/2017 |
|---|---|---|
| CN | 108347293 A | 7/2018 |
| CN | 108401286 A | 8/2018 |
| WO | 2017199205 A1 | 11/2017 |
| WO | 2018143725 A1 | 8/2018 |

OTHER PUBLICATIONS

Samsung. "Enhancements on configured grant for NR-U" 1-20 3GPP TSG RAN WG1 Meeting #94bis R1-1810863 Chengdu, China, Oct. 8-12, 2018, Sep. 29, 2018 (Sep. 29, 2018).
Nec. "Discussion on configured grants in NR-U" 1-20 3GPP TSG RAN WG1 #94bis R1-1810810 Chengdu, China, Oct. 8-12, 2018, Sep. 28, 2018 (Sep. 28, 2018).
R1-1812652:Discussion on configured grants in NR-U:83 3GPP,(WG2= TSG_RAN or WG2=WG1_RL1)and (PD1=[Jan. 1, 2014 TO Dec. 24, 2018])and(FTS=unlicensed)and(FTS=subcarrier spacing)and (FTS= AUL)and (FTS=offset) and(FTS=colision).
CN201811578513.5 First Search Report dated Nov. 10, 2020.
CN201811578513.5 1st Office Action dated Nov. 16, 2020.
ISR received in application No. PCT/CN2019/122700 dated Mar. 4, 2020.
ISR in application PCT/CN2019/122700 dated Feb. 26, 2020.
Samsung."Enhancements on configured grant for NR-U" 3GPPTSG RAN WGIMeeting #94bis R1-1810863 Chengdu, China, Oct. 8-12, 2018. Sep. 29, 2018(Sep. 29, 2018),section 2.1.
Nec. "Discussion on configured grants in NR-U" 3GPP TSG RAN WGI#94bis R1-1810810 Chengdu,China,Oct. 8-12, 2018, Sep. 28, 2018(Sep. 28, 2018).

* cited by examiner

Between N and a target offset set only N is related to a subcarrier spacing(SCS) of subcarriers occupied by first radio signal Examples:
- SCS=15 kHz: N=2
The target offset set includes {16 μs, 25 μs, 34 μs, 43 us, 52 μs, 61 μs, OS #1(15 kHz)}
- SCS=30 kHz: N=3
The target offset set includes {16 μs, 25 μs, 34 μs, 43 μs, 52 μs, 61 μs, OS #2(30 kHz)}
- SCS=60 kHz: N=5
The target offset set includes {16 μs, 25 μs, 34 μs, 43 μs, 52 μs, 61 μs, OS #4(60 kHz)}

FIG. 8

Between N and a target offset set only the target offset set is related to a subcarrier spacing (SCS) of subcarriers occupied by first radio signal Examples:
- SCS=15 kHz: N=2
The target offset set includes {16 Ms, 25 Ms, 34 Ms, 43 Ms, 52 Ms, 61 Ms, OS #1(15 kHz)}
- SCS=30 kHz: N=2
The target offset set includes{16 Ms, 25 Ms, OS #1(30 kHz)}
- SCS=60 kHz: N=2
The target offset set includes{16 Ms, OS #1(60 kHz)} or {OS #1(60 kHz)}

FIG. 9

> Both N and a target offset set are related to a subcarrier spacing (SCS) of subcarriers occupied by first radio signal, while N1 is unrelated to the SCS of subcarriers occupied by first radio signal Examples:
- SCS=15 kHz: N=2, N1=1
The target offset set includes {OS #1(15 kHz), OS #1(15 kHz)- 9 μs, OS #1(15 kHz)- 18 μs, OS #1(15 kHz)- 27 μs, OS #1(15 kHz)- 36 μs, OS #1(15 kHz)- 45 μs, OS #2(30 kHz)- 54 μs, OS #2(30 kHz)- 63 μs}
- SCS=30 kHz: N=3, N1=1
The target offset set includes {OS #2(30 kHz), OS #2(30 kHz)- 9 μs, OS #2(30 kHz)- 18 μs, OS #2(30 kHz)- 27 μs, OS #2(30 kHz)- 36 μs, OS #2(30 kHz)- 45 μs, OS #2(30 kHz)- 54 μs, OS #2(30 kHz)- 63 μs}
- SCS=60 kHz: N=5, N1=1
The target offset set includes {OS #4(60 kHz), OS #4(60 kHz)- 9 μs, OS #4(60 kHz)- 18 μs, OS #4(60 kHz)- 27 μs, OS #4(60 kHz)- 36 μs, OS #4(60 kHz)- 45 μs, OS #4(60 kHz)- 54 μs, OS #4(60 kHz)- 63 μs}

FIG. 10

> Both N and a target offset set are related to a subcarrier spacing (SCS) of subcarriers occupied by first radio signal, and N1 is related to the SCS of subcarriers occupied by the first radio signal Examples:
- SCS=15 kHz: N=2, N1=1
The target offset set includes {OS #1(15 kHz)}
- SCS=30 kHz: N=3, N1=2
The target offset set includes {OS #2(30 kHz), OS#1(30 kHz)}
- SCS=60 kHz: N=5, N1=4
The target offset set includes {OS #4(60 kHz), OS #3(60 kHz), OS #2(60 kHz), OS #1(60 kHz)}

FIG. 11

SCS of subcarriers occupied by first radio signal = first subcarrier, so that the number of bits comprised in second information = first bit number SCS of subcarriers occupied by first radio signal = second carrier, so that the number of bits comprised in second information = second bit number first subcarrier ≠ second subcarrier
first bit number ≠ second bit number

FIG. 15

METHOD AND DEVICE IN UE AND BASE STATION FOR IDENTIFYING START TIME OF TRANSMISSION USING SUBCARRIER SPACING INFORMATION USED FOR WIRELESS COMMUNICATION

CROSS REFERENCE TO RELATED APPLICATIONS

This application is a continuation of International Application No. PCT/CN2019/122700, filed Dec. 3, 2019, claims the priority benefit of Chinese Patent Application No. 201811578513.5, filed on Dec. 24, 2018, the full disclosure of which is incorporated herein by reference.

BACKGROUND

Technical Field

The present disclosure relates to transmission methods and devices in wireless communication systems, and in particular to a communication method and device that support data transmission on Unlicensed Spectrum.

Related Art

In a traditional $3^{rd}$ Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time. Since uplink transmission in a traditional LTE system is usually based on the Grant of a base station, Release 15 has introduced Autonomous UpLink (AUL) transmission in Unlicensed Spectrum to avoid reduction in resource utilization and possible latency caused by frequency LBTs. In AUL, a User Equipment (UE) is able to perform uplink transmission autonomously in radio resources pre-configured by a base station.

Application scenarios of future wireless communication systems are becoming increasingly diversified, and different application scenarios have different performance demands on systems. In order to meet different performance requirements of various application scenarios, it was decided at the 3rd Generation Partner Project (3GPP) Radio Access Network (RAN) #72th plenary that that a study on New Radio (NR), or what is called Fifth Generation (5G), shall be conducted. The work item (WI) of NR was approved at the 3GPP RAN #75th plenary to standardize NR. Compared with the current LTE system, 5G NR is significantly featured by supporting more flexible Numerology, such as a Subcarrier Spacing (SCS) and a Cyclic Prefix (CP) length, and supporting a more varied Frame Structure, including mini-slots, sub-slots and slot aggregation. Such flexibility of Numerology and Frame Structure will better serve the needs of new traffics, particularly those in highly diverse vertical industries. At present, the technique of access to Unlicensed Spectrum in 5G NR (New Radio Access Technology) is still under discussion, when designing uplink transmission in Unlicensed Spectrum, more consideration shall be put into supporting Numerology with higher flexibility.

SUMMARY

Inventors find through researches that more flexible Numerology is an important feature that distinguishes an NR system from the LTE system. In uplink transmissions on Unlicensed Spectrum in the NR system, how to meet NR's demands on Numerology with higher flexibility so as to ensure multiple transmitting nodes' sharing of Unlicensed Spectrum resources has been a key issue that remains to be handled.

To address the above problem, the present disclosure provides a solution. It should be noted that the embodiments of the present disclosure and the characteristics in the embodiments may be mutually combined if no conflict is incurred.

The present disclosure provides a method in a UE for wireless communications, comprising:
  receiving first information; and
  transmitting a first radio signal in a first time window in a first frequency sub-band;
  herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, a problem to be solved in the present disclosure is that in order to enhance the resource utilization ratio, multiple UEs may share same Unlicensed Spectrum resources, however, inter-user interference may be quite apparent when the multiple UEs are preempting a channel at the same time. To reduce such interference, there is a key issue needed to be solved, that is, how to assign a start time for transmission to the UE given that flexible Numerology is supported.

In one embodiment, the essence of the above method lies in that a first time window in a first frequency sub-band comprises time-frequency resources allocated to Grant-Free uplink transmission, a first radio signal referring to the Grant-Free uplink transmission. W start time(s) is(are) candidate start time(s) for the Grant-Free uplink transmission, of which each belongs to N time units, and the N time units are N multicarrier symbols, the size of N depending on an SCS and/or a target offset set depending on the SCS. An advantage of the above method is that the NR system's demands on more flexible Numerology can be met through designing a start time for transmission in the Grant-Free uplink transmission, thereby guaranteeing sharing of the Unlicensed Spectrum resources by more than one transmitting nodes.

According to one aspect of the present disclosure, the above method is characterized in that S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

According to one aspect of the present disclosure, the above method is characterized in that the W start time(s) comprises(comprise) start time(s) respectively corresponding to N1 time unit(s) out of the N time units, N1 being related to the SCS of the subcarriers occupied by the first radio signal, and N1 being a positive integer no greater than the N.

In one embodiment, the essence of the above method lies in that N1 is a number of time unit(s) of N time units whose corresponding start time(s) belongs(belong) to a target offset set, both the size of N and the target offset set are related to an SCS, and the size of N1 also depends on the SCS. An advantage of the above method is that the design of a start time for transmission in Grant-Free uplink transmission helps meet the needs of the NR system for more flexible Numerology.

According to one aspect of the present disclosure, the above method is characterized in that the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively, or, there are two start times respectively belonging to two of the M subsets and also to a same time unit of the N time units.

In one embodiment, the essence of the above method lies in that two ways of designing start time set have been proposed: one design is to make M=N, M subsets respectively corresponding to N multicarrier symbols, and start times respectively comprised by M subsets belonging to N multicarrier symbols respectively; while the other is that two subsets of the M subsets may both comprise start time(s) belonging to a same multicarrier symbol.

According to one aspect of the present disclosure, the above method is characterized in that a first subset is any subset of the M subsets that comprises more than one start time, and a time offset between any two start times in the first subset is equal to a positive integral multiple of a first time offset.

In one embodiment, the essence of the above method lies in that a first time offset refers to time duration of a slot duration in LBT, lasting 9 μs.

According to one aspect of the present disclosure, the above method is characterized in comprising:
transmitting second information;
herein, the second information is used for indicating a time unit of the N time units to which the start time for the transmission of the first radio signal belongs.

According to one aspect of the present disclosure, the above method is characterized in that a number of bits comprised in the second information is related to the SCS of subcarriers occupied by the first radio signal.

In one embodiment, the essence of the above method lies in that the size of N is related to the SCS, and second information is used for indicating a starting multicarrier symbol for transmission of the first radio signal from N multicarrier symbols, so a number of bits comprised in the second information is related to the SCS.

According to one aspect of the present disclosure, the above method is characterized in comprising:
performing a first access detection in the first frequency sub-band;
herein, the first access detection is used for determining that the first radio signal is to be transmitted in the first time window in the first frequency sub-band.

The present disclosure provides a method in a base station for wireless communications, comprising:
transmitting first information; and
receiving a first radio signal in a first time window in a first frequency sub-band;
herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

According to one aspect of the present disclosure, the above method is characterized in that S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

According to one aspect of the present disclosure, the above method is characterized in that the W start time(s) comprises(comprise) start time(s) respectively corresponding to N1 time unit(s) out of the N time units, N1 being related to the SCS of the subcarriers occupied by the first radio signal, and N1 being a positive integer no greater than the N.

According to one aspect of the present disclosure, the above method is characterized in that the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively, or, there are two start times respectively belonging to two of the M subsets and also to a same time unit of the N time units.

According to one aspect of the present disclosure, the above method is characterized in that a first subset is any subset of the M subsets that comprises more than one start time, and a time offset between any two start times in the first subset is equal to a positive integral multiple of a first time offset.

According to one aspect of the present disclosure, the above method is characterized in comprising:
receiving second information;

herein, the second information is used for indicating a time unit of the N time units to which the start time for the transmission of the first radio signal belongs.

According to one aspect of the present disclosure, the above method is characterized in that a number of bits comprised in the second information is related to the SCS of subcarriers occupied by the first radio signal.

According to one aspect of the present disclosure, the above method is characterized in comprising:

monitoring in the first time window in the first frequency sub-band whether the first radio signal is transmitted;

herein, a receiver of the first information performs a first access detection in the first frequency sub-band to determine that the first radio signal is to be transmitted in the first time window in the first frequency sub-band.

The present disclosure provides a UE for wireless communications, comprising:

a first receiver, receiving first information; and a first transmitter, transmitting a first radio signal in a first time window in a first frequency sub-band;

herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

The present disclosure provides a base station for wireless communications, comprising:

a second transmitter, transmitting first information; and a second receiver, receiving a first radio signal in a first time window in a first frequency sub-band;

herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the present disclosure is advantageous over conventional schemes in the following aspects:

The present disclosure proposes a method of assigning a start time for transmission to a UE to reduce inter-user interference incurred by multiple UEs' preemption of Unlicensed Spectrum simultaneously, thereby realizing the sharing of Unlicensed Spectrum resources by multiple transmitting nodes.

The method in the present disclosure takes into account designs under different SCSs, thus meeting the needs of the NR system about flexible Numerology.

BRIEF DESCRIPTION OF THE DRAWINGS

Other features, objects and advantages of the present disclosure will become more apparent from the detailed description of non-restrictive embodiments taken in conjunction with the following drawings:

FIG. 8 illustrates a schematic diagram of a target offset set according to one embodiment of the present disclosure.

FIG. 9 illustrates a schematic diagram of a target offset set according to another embodiment of the present disclosure.

FIG. 10 illustrates a schematic diagram of a target offset set according to another embodiment of the present disclosure.

FIG. 11 illustrates a schematic diagram of a target offset set according to another embodiment of the present disclosure.

FIG. 15 illustrates a schematic diagram of relationship between second information and an SCS of subcarriers occupied by the first radio signal according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
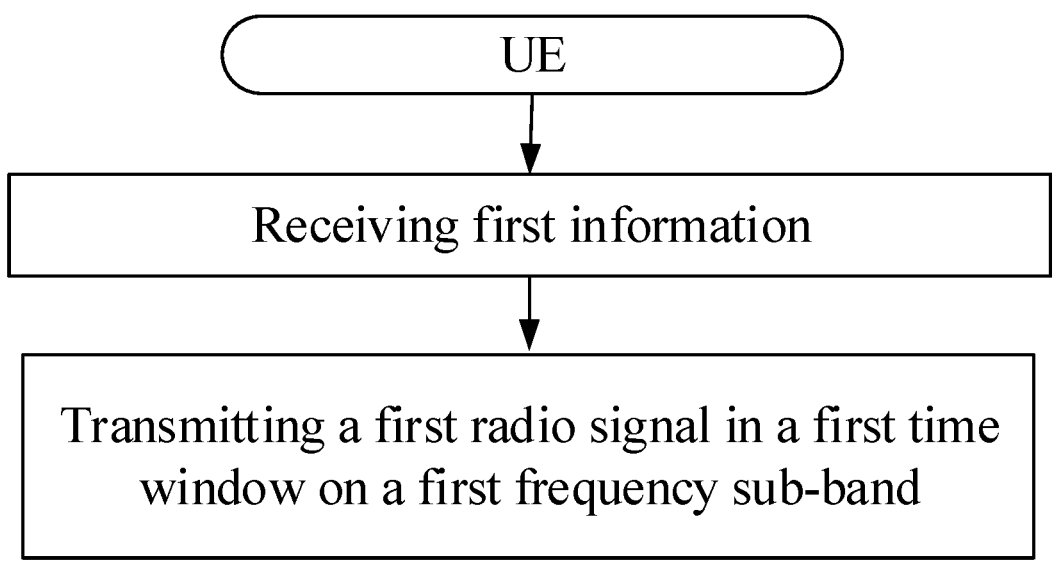
FIG. 1 illustrates a flowchart of first information and a first radio signal according to one embodiment of the present disclosure.

Embodiment 1 illustrates a flowchart of first information and a first radio signal, as shown in FIG. 1.

In Embodiment 1, the UE in the present disclosure receives first information, and transmits a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the first information is transmitted on a frequency band deployed at Unlicensed Spectrum.

In one embodiment, the first information is transmitted on a frequency band deployed at Licensed Spectrum.

In one embodiment, the first information is transmitted on the first frequency sub-band.

In one embodiment, the first information is transmitted on a frequency band other than the first frequency sub-band.

In one embodiment, the first information is transmitted on a downlink physical layer control channel (i.e., a downlink channel only capable of carrying a physical layer signaling).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first information is transmitted on a downlink physical layer data channel (i.e., a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first time window comprises a consecutive time duration.

In one embodiment, the first time window comprises a positive integer number of consecutive slots.

In one embodiment, the first time window comprises a positive integer number of consecutive subframes.

In one embodiment, the first time window comprises a positive integer number of consecutive mini-slots.

In one embodiment, the first time window comprises a slot.

In one embodiment, the first time window comprises a subframe.

In one embodiment, the first time window comprises a mini-slot.

In one embodiment, the first time window is composed of a positive integer number of consecutive multicarrier symbols.

In one embodiment, the first time window is composed of a multicarrier symbol.

In one embodiment, the first time window is a time window of T time window(s), T being a positive integer.

In one subembodiment of the above embodiment, the above method also comprises:

Autonomously selecting a first time window from the T time windows;

the T being greater than 1.

In one subembodiment, any two of the T time windows are orthogonal.

In one subembodiment, there are two time windows of the T time windows that are overlapping (that is, non-orthogonal).

In one subembodiment, any two of the T time windows are of equal duration.

In one subembodiment, any of the T time windows comprises a consecutive time duration.

In one subembodiment, any of the T time windows comprises a positive integer number of consecutive slots.

In one subembodiment, any of the T time windows comprises a positive integer number of consecutive subframes.

In one subembodiment, any of the T time windows comprises a positive integer number of consecutive mini-slots.

In one subembodiment, any of the T time windows comprises a slot.

In one subembodiment, any of the T time windows comprises a subframe.

In one subembodiment, any of the T time windows comprises a mini-slot.

In one subembodiment, any of the T time windows is composed of a positive integer number of consecutive multicarrier symbols.

In one subembodiment, any of the T time windows is composed of a multicarrier symbol.

In one embodiment, the first frequency sub-band comprises a positive integer number of Physical Resource Block(s) (PRB).

In one embodiment, the first frequency sub-band comprises a positive integer number of consecutive PRBs.

In one embodiment, the first frequency sub-band comprises a positive integer number of Resource Block(s) (RB).

In one embodiment, the first frequency sub-band comprises a positive integer number of consecutive RBs.

In one embodiment, the first frequency sub-band comprises a positive integer number of consecutive subcarriers.

In one embodiment, a number of subcarriers comprised in the first frequency sub-band is equal to a positive integral multiple of 12.

In one embodiment, the first frequency sub-band is deployed at Unlicensed Spectrum.

In one embodiment, the first frequency sub-band is deployed at Licensed Spectrum.

In one embodiment, the first frequency sub-band comprises a Carrier.

In one embodiment, the first frequency sub-band comprises at least one Carrier.

In one embodiment, the first frequency sub-band belongs to a Carrier.

In one embodiment, the first frequency sub-band comprises a Bandwidth Part (BWP).

In one embodiment, the first frequency sub-band comprises multiple BWPs.

In one embodiment, the first frequency sub-band comprises one or multiple BWPs.

In one embodiment, the first frequency sub-band comprises a Subband.

In one embodiment, the first frequency sub-band comprises multiple Subbands.

In one embodiment, the first frequency sub-band comprises one or multiple Subbands.

In one embodiment, frequency-domain resources occupied by the first radio signal belong to the first frequency sub-band, while time-domain resources occupied by the first radio signal belong to the first time window.

In one embodiment, the first radio signal comprises at least one of data or (a) reference signal(s).

In one embodiment, the first radio signal comprises data.

In one embodiment, the first radio signal comprises (a) reference signal(s).

In one embodiment, the first radio signal comprises data and (a) reference signal(s).

In one embodiment, the data comprised by the first radio signal is uplink data.

In one embodiment, the reference signal(s) comprised by the first radio signal includes(include) one or more of a DeModulation Reference Signal (DMRS), a Sounding Reference Signal (SRS), or a Phase error Tracking Reference Signal (PTRS).

In one embodiment, the reference signal(s) comprised by the first radio signal includes(include) an SRS.

In one embodiment, the reference signal(s) comprised by the first radio signal includes(include) a DMRS.

In one embodiment, the reference signal(s) comprised by the first radio signal includes(include) a PTRS.

In one embodiment, the first radio signal is transmitted on an uplink random access channel.

In one subembodiment, the uplink random access channel is a Physical Random Access Channel (PRACH).

In one embodiment, a transmission channel for the first radio signal is an Uplink Shared Channel (UL-SCH).

In one embodiment, the first radio signal is transmitted on an uplink physical layer data channel (i.e., an uplink channel capable of carrying physical layer data).

In one subembodiment, the uplink physical layer data channel is a Physical Uplink Shared CHannel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

In one embodiment, the reference time is pre-defined or configurable.

In one embodiment, the reference time is pre-defined.

In one embodiment, the reference time is configurable.

In one embodiment, the reference time is an instant of time in the first time window.

In one embodiment, the reference time is a start of the first time window.

In one embodiment, the reference time is a start time earlier than the first time window.

In one embodiment, the reference time is a start time for a multicarrier symbol in the first time window.

In one embodiment, the reference time is a start time for an earliest multicarrier symbol in the first time window.

In one embodiment, the first time window comprises NO time units, the N time unit(s) is(are) earliest N time unit(s) of the NO time units, and the reference time is a start time for an earliest time unit of the NO time units, NO being a positive integer no less than the N.

In one embodiment, the target offset set is pre-defined or configurable.

In one embodiment, the target offset set is pre-defined.

In one embodiment, the target offset set is configurable.

In one embodiment, the target offset set is semi-statically configured.

In one embodiment, the target offset set is configured by a higher-layer signaling.

In one embodiment, the target offset set is configured by an RRC signaling.

In one embodiment, the target offset set is configured by a MAC CE signaling.

In one embodiment, the target offset set is indicated dynamically.

In one embodiment, the target offset set is indicated by a DCI signaling.

In one embodiment, each of the W offset value(s) is a positive real number.

In one embodiment, each of the W offset value(s) is a non-negative real number.

In one embodiment, the W is greater than 1.

In one embodiment, the W is equal to 1.

In one embodiment, any of the N time unit(s) comprises a subframe.

In one embodiment, any of the N time unit(s) comprises a slot.

In one embodiment, any of the N time unit(s) comprises a mini-slot.

In one embodiment, any of the N time unit(s) comprises a positive integer number of consecutive subframes.

In one embodiment, any of the N time unit(s) comprises a positive integer number of consecutive slots.

In one embodiment, any of the N time unit(s) comprises a positive integer number of consecutive mini-slots.

In one embodiment, any of the N time unit(s) comprises a multicarrier symbol.

In one embodiment, any of the N time unit(s) comprises a positive integer number of consecutive multicarrier symbols.

In one embodiment, any two of the N time units are of equal duration.

In one embodiment, the N time unit(s) occupies(occupy) contiguous time-domain resources.

In one embodiment, any two of the N time units that are adjacent in time domain are consecutive.

In one embodiment, no gap exists between any two of the N time units that are adjacent in time domain.

In one embodiment, there are two non-consecutive time units of the N time units that are adjacent in time domain.

In one embodiment, there are two time units, with a gap in between, of the N time units that are adjacent in time domain.

In one embodiment, the N is equal to 1.

In one embodiment, the N is greater than 1.

In one embodiment, the first time window comprises N0 time unit(s), and any of the N time unit(s) is a time unit of the N0 time unit(s), N0 being a positive integer no less than the N.

In one embodiment, the first time window comprises N0 time units, and the N time unit(s) is(are) earliest N time unit(s) of the N0 time units, N0 being a positive integer no less than the N.

In one embodiment, between the N and the target offset set only the N is related to an SCS of subcarriers occupied by the first radio signal.

In one subembodiment, the W is unrelated to the SCS of the subcarriers occupied by the first radio signal.

In one subembodiment, the target offset set is unrelated to the SCS of the subcarriers occupied by the first radio signal.

In one embodiment, between the N and the target offset set only the target offset set is related to an SCS of subcarriers occupied by the first radio signal.

In one subembodiment, the W is related to the SCS of the subcarriers occupied by the first radio signal.

In one subembodiment, the N is unrelated to the SCS of the subcarriers occupied by the first radio signal.

In one embodiment, both the N and the target offset set are related to an SCS of subcarriers occupied by the first radio signal.

In one subembodiment, the W is unrelated to the SCS of the subcarriers occupied by the first radio signal.

In one subembodiment, the W is related to the SCS of the subcarriers occupied by the first radio signal.

Embodiment 2

Figure 2:
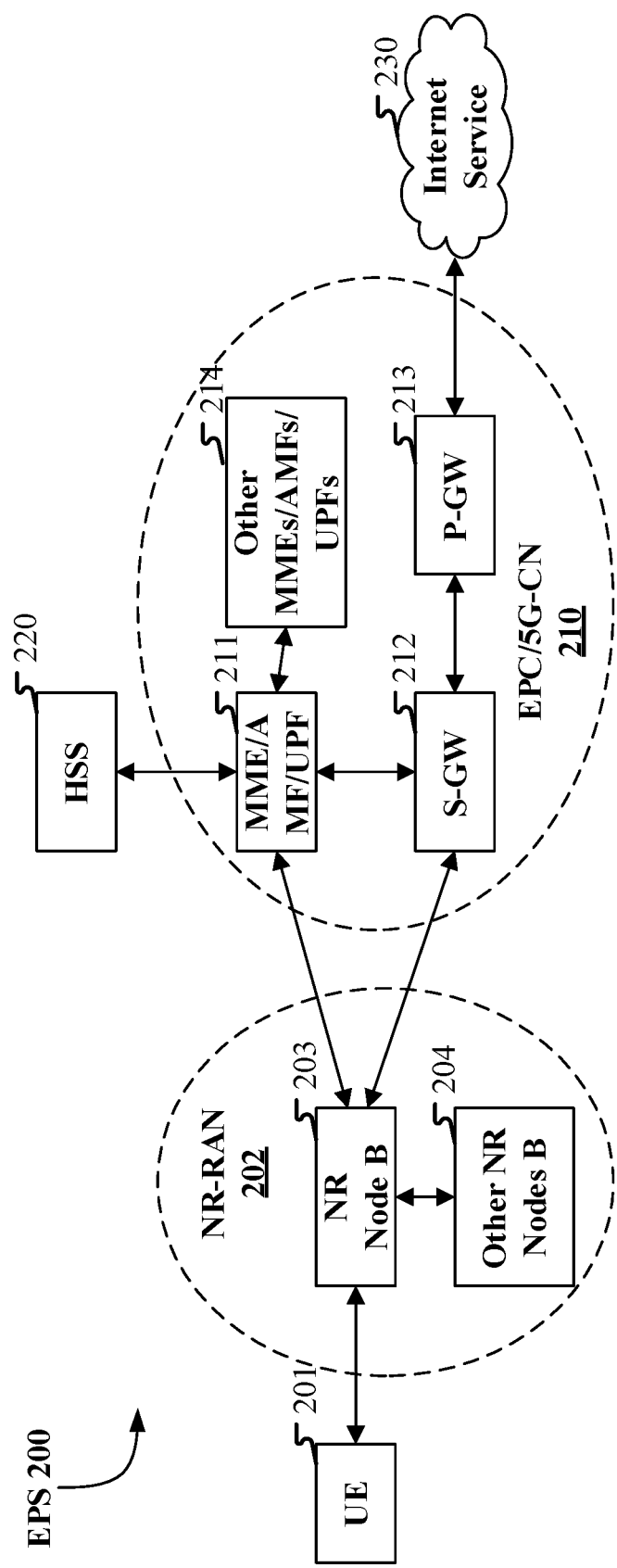
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure. FIG. 2 is a diagram illustrating a network architecture 200 of NR 5G, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms.

The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the UE in the present disclosure.

In one embodiment, the gNB 203 corresponds to the base station in the present disclosure.

In one embodiment, the UE 201 supports wireless communications where data is transmitted on Unlicensed Spectrum.

In one embodiment, the UE 201 supports wireless communications where data is transmitted on Licensed Spectrum.

In one embodiment, the gNB 203 supports wireless communications where data is transmitted on Unlicensed Spectrum.

In one embodiment, the gNB 203 supports wireless communications where data is transmitted on Licensed Spectrum.

In one embodiment, the UE 201 supports massive MIMO-based wireless communications.

In one embodiment, the gNB 203 supports massive MIMO-based wireless communications.

Embodiment 3

Figure 3:
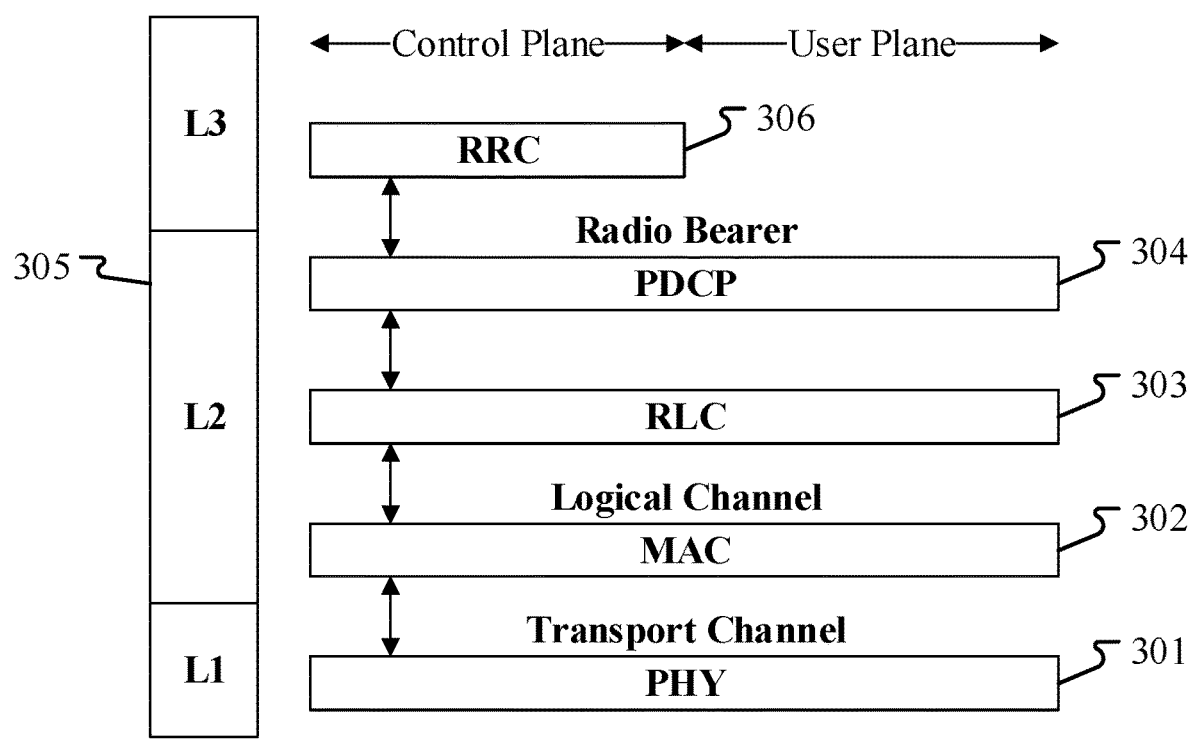
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first information in the present disclosure is generated by the PHY 301.

In one embodiment, the first information in the present disclosure is generated by the RRC sublayer 306.

In one embodiment, the first information in the present disclosure is generated by the MAC sublayer 302.

In one embodiment, the first access detection in the present disclosure which is performed in the first frequency sub-band in the present disclosure is generated by the PHY 301.

In one embodiment, the first radio signal in the present disclosure to be transmitted in the first time window in the first frequency sub-band of the present disclosure is generated by the PHY 301.

In one embodiment, the second information in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the fourth information in the present disclosure is generated by the PHY 301.

In one embodiment, the fourth information in the present disclosure is generated by the RRC sublayer 306.

In one embodiment, the fourth information in the present disclosure is generated by the MAC sublayer 302.

Embodiment 4

Figure 4:
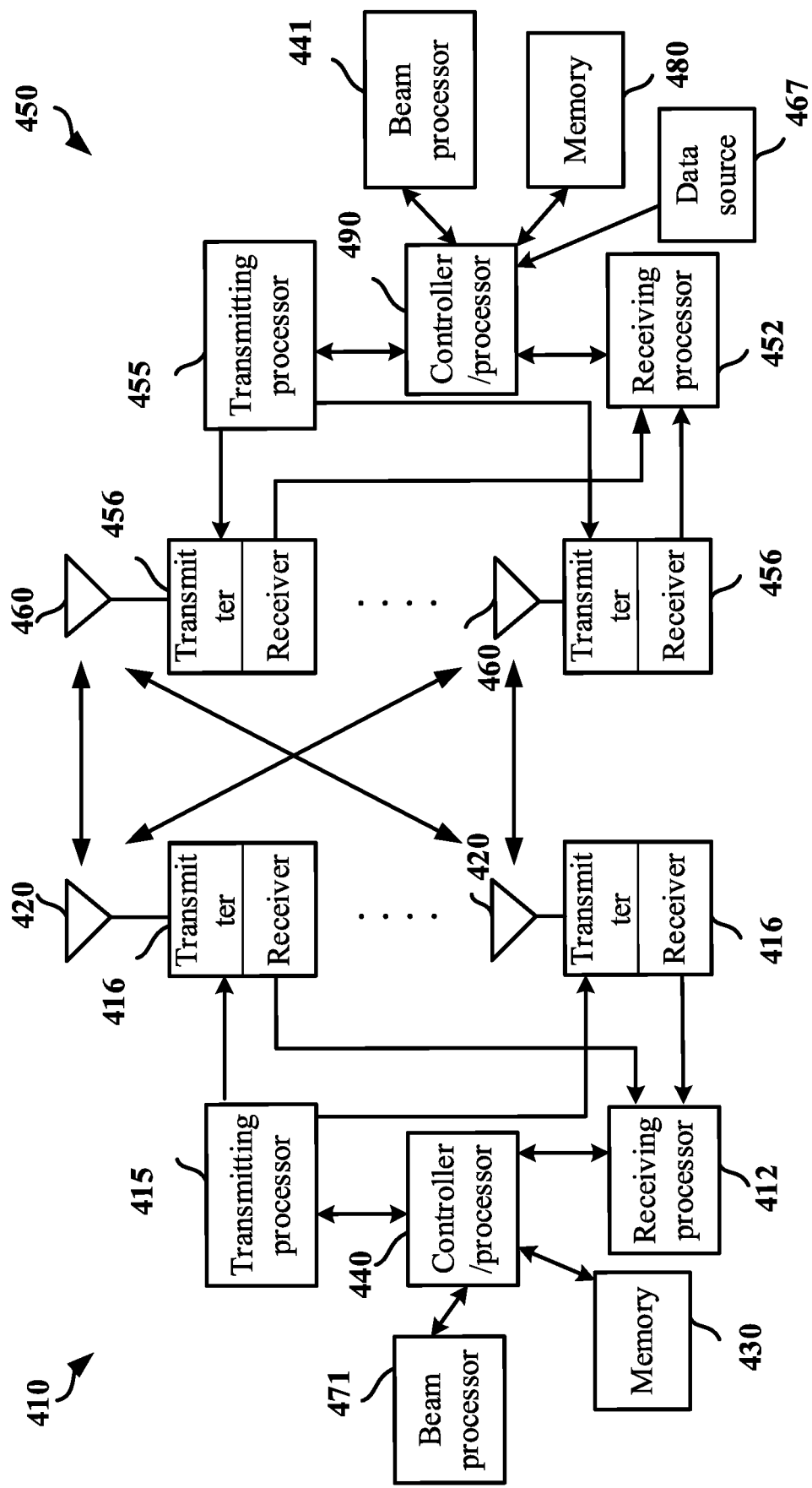
FIG. 4 illustrates a schematic diagram of a New Radio (NR) node and a UE according to one embodiment of the present disclosure.

Embodiment 4 illustrates a schematic diagram of a base station (NR node) and a UE, as shown in FIG. 4. FIG. 4 is a block diagram of a gNB 410 in communication with UE 450 in an access network.

A base station (410) comprises a controller/processor 440, a memory 430, a receiving processor 412, a beam processor 471, a transmitting processor 415, a transmitter/receiver 416 and an antenna 420.

A UE (450) comprises a controller/processor 490, a memory 480, a data source 467, a beam processor 441, a transmitting processor 455, a receiving processor 452, a transmitter/receiver 456 and antenna 460.

In downlink transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 determines first information.

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitting processor 415 receives bit flows output from the controller/processor 440 and provides various signal transmitting processing functions used for the L1 layer (that is PHY), including multi-antenna transmission, spreading, code division multiplexing, and precoding.

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In downlink transmission, processes relevant to the UE 450 may comprise the following:

The receiver 456 is used to convert a radio frequency signal received via the antenna 460 into a baseband signal to be provided to the receiving processor 452.

The receiving processor 452 provides various signal receiving processing functions used for the L1 layer (that is PHY), including decoding, de-interleaving, descrambling, demodulating and extraction of physical layer control signaling.

The receiving processor 452 provides various signal receiving processing functions used for the L1 layer (that is PHY), including multi-antenna reception, despreading, code division multiplexing and precoding.

The beam processor 441 determines first information.

The controller/processor 490 receives bit flows output by the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The receiving processor 412 provides various signal receiving processing functions used for the L1 layer (that is PHY), including multi-antenna reception, despreading, code division multiplexing and precoding.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE450; the higher-layer packet may be provided to a core network.

The beam processor 471 determines to receive a first radio signal in a first time window in a first frequency sub-band.

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal transmitting processing functions used for the L1 layer (i.e., PHY), including coding, interleaving, scrambling, modulation and generation of physical layer control signaling.

The transmitting processor 455 provides various signal transmitting processing functions used for the L1 layer (i.e., PHY), including multi-antenna transmission, spreading, code division multiplexing and precoding.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 determines to transmit a first radio signal in a first time window in a first frequency sub-band.

In one embodiment, the UE 450 comprises at least one processor and at least one memory. The at least one memory includes computer program codes. The at least one memory and the computer program codes are configured to be used in collaboration with the at least one processor. The UE 450 at least receives first information; and transmits a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the UE 450 comprises a memory that stores a computer readable instruction program. The computer readable instruction program generates actions when executed by at least one processor, which include: receiving first information; and transmitting a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the gNB 410 comprises at least one processor and at least one memory. The at least one memory includes computer program codes. The at least one memory and the computer program codes are configured to be used in collaboration with the at least one processor. The gNB 410 at least transmits first information; and receives a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the gNB 410 comprises a memory that stores a computer readable instruction program. The computer readable instruction program generates actions when executed by at least one processor, which include: transmitting first information; and receiving a first radio signal in a first time window in a first frequency sub-band; herein, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, the UE 450 corresponds to the UE of the present disclosure.

In one embodiment, the gNB 410 corresponds to the base station of the present disclosure.

In one embodiment, at least the first two of the receiver 456, the receiving processor 452 and the controller/processor 490 are used for receiving the first information of the present disclosure.

In one embodiment, at least the first two of the transmitter 416, the transmitting processor 415 and the controller/processor 440 are used for transmitting the first information of the present disclosure.

In one embodiment, at least the first two of the receiver 456, the receiving processor 452 and the controller/processor 490 are used for receiving the third information of the present disclosure.

In one embodiment, at least the first two of the transmitter 416, the transmitting processor 415 and the controller/processor 440 are used for transmitting the third information of the present disclosure.

In one embodiment, at least the first two of the receiver 456, the receiving processor 452 and the controller/processor 490 are used for performing the first access detection of the present disclosure on the first frequency sub-band of the present disclosure.

In one embodiment, at least the first two of the transmitter 456, the transmitting processor 455 and the controller/processor 490 are used for transmitting the first radio signal of the present disclosure in the first time window in the first frequency sub-band of the present disclosure.

In one embodiment, at least the first two of the receiver 416, the receiving processor 412 and the controller/processor 440 are used for receiving the first radio signal of the present disclosure in the first time window in the first frequency sub-band of the present disclosure.

In one embodiment, at least the first two of the transmitter 456, the transmitting processor 455 and the controller/ processor 490 are used for transmitting the second information of the present disclosure.

In one embodiment, at least the first two of the receiver 416, the receiving processor 412 and the controller/processor 440 are used for receiving the second information of the present disclosure.

In one embodiment, at least the first two of the transmitter 456, the transmitting processor 455 and the controller/ processor 490 are used for transmitting the fourth information of the present disclosure.

In one embodiment, at least the first two of the receiver 416, the receiving processor 412 and the controller/processor 440 are used for receiving the fourth information of the present disclosure.

Embodiment 5

Figure 5:
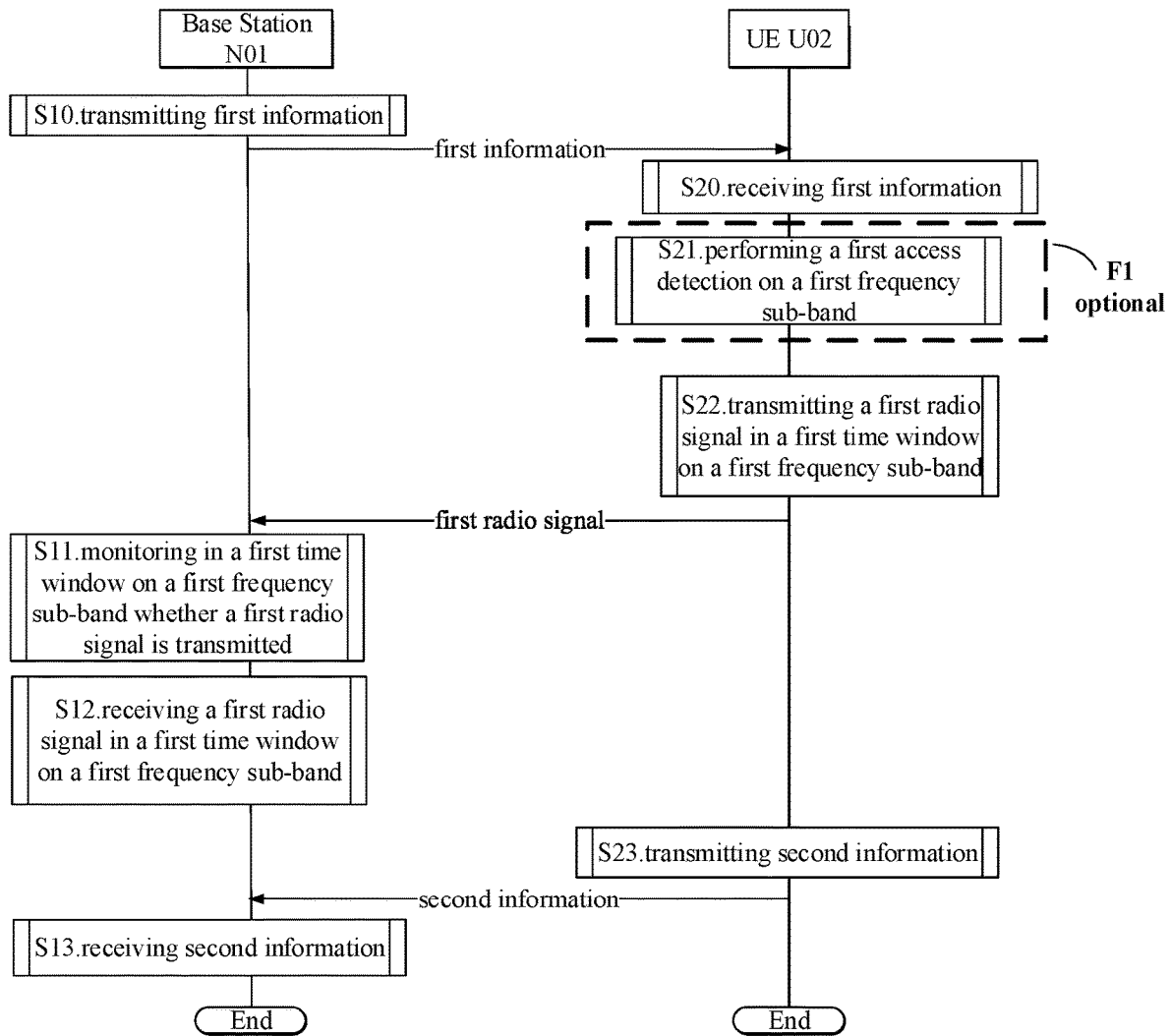
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, the box F1 is optional.

The N01 transmits first information in step S10; and monitors whether a first radio signal is transmitted in a first time window in a first frequency sub-band in step S11; receives the first radio signal in the first time window in the first frequency sub-band in step S12; and receives second information in step S13.

The U02 receives first information in step S20; and performs a first access detection in a first frequency sub-band in step S21; transmits a first radio signal in a first time window in the first frequency sub-band in step S22; and transmits second information in step S23.

In Embodiment 5, the first information is used by the U02 for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a sub carrier spacing (SCS) of subcarriers occupied by the first radio signal; at least one of the N or the target offset set is related to the SCS of the subcarriers occupied by the first radio signal. The second information is used for indicating a time unit of the N time units to which the start time for the transmission of the first radio signal belongs. The first access detection is used by the U02 for determining that the first radio signal is to be transmitted in the first time window in the first frequency sub-band.

In one embodiment, the second information belongs to Uplink control information (UCI).

In one embodiment, the second information is transmitted on an uplink random access channel.

In one subembodiment, the uplink random access channel is a PRACH.

In one embodiment, a transmission channel for the second information is a UL-SCH.

In one embodiment, the second information is transmitted on an uplink physical layer data channel.

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, the second information is transmitted on an uplink physical layer control channel (i.e., an uplink channel only capable of carrying a physical layer signaling).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, the second information is transmitted in the first time window in the first frequency sub-band.

In one embodiment, a transmission time of the second information is no earlier than the start time for the transmission of the first radio signal.

In one embodiment, the above method also comprises:
receiving fourth information;
herein, the fourth information comprises scheduling information of the first radio signal.

In one embodiment, the second information and the fourth information belong to a same piece of UCI.

In one embodiment, the second information and the fourth information are transmitted on a same physical layer channel.

In one embodiment, the fourth information is transmitted in the first time window in the first frequency sub-band.

In one embodiment, a transmission time of the fourth information is no earlier than the start time for the transmission of the first radio signal.

In one embodiment, the scheduling information of the first radio signal comprises at least one of a HARQ process number, a New Data Indicator (NDI), a Redundant Version (RV), a UE ID, an ending time, an ending time unit, a Channel Occupancy Time (COT) sharing indicator or Cyclic Redundancy Check (CRC).

In one subembodiment, the ending time unit is a time unit in the first time window.

In one subembodiment, the HARQ process number is a serial number of a HARQ process corresponding to the data comprised by the first radio signal.

In one subembodiment, the NDI indicates whether the data comprised by the first radio signal is a retransmission of new data or a retransmission of old data.

In one embodiment, the first access detection comprises performing Q energy detection(s) respectively in Q time sub-pool(s) in the first frequency sub-band to obtain Q detection value(s); each of Q1 detection value(s) of the Q detection value(s) is lower than a first reference threshold, Q1 being a positive integer no greater than Q.

In one subembodiment, an end time for the Q time sub-pool(s) is no later than the start time for the transmission of the first radio signal.

In one subembodiment, an end time for the Q time sub-pool(s) is earlier than the start time for the transmission of the first radio signal.

In one embodiment, the first access detection is Listen Before Talk (LBT), for the detailed definition and way of implementation of the LBT, refer to 3GPP TR36.889.

In one embodiment, the first access detection is Clear Channel Assessment (CCA), for the detailed definition and way of implementation of the CCA, refer to 3GPP TR36.889.

In one embodiment, the first access detection is used by the U02 for determining whether the first frequency sub-band is idle.

In one embodiment, the first access detection is an uplink (UL) access detection.

In one embodiment, the first access detection is used by the U02 for determining whether the first frequency sub-band can be used by the U02 for uplink transmission.

In one embodiment, the first access detection is implemented in a way defined by 3GPP TS36.213, section 15.2.

In one embodiment, the Q1 is equal to the Q.

In one embodiment, the Q1 is less than the Q.

In one embodiment, whether the first radio signal is transmitted is under monitoring in each of the N time windows in the first frequency sub-band.

In one embodiment, the monitoring refers to blind detection, which means receiving a signal and performing decoding, when the decoding is determined as correct according to a Cyclic Redundancy Check (CRC) bit, it is determined that a given radio signal is transmitted in a given time window in a given frequency sub-band; otherwise, it is determined that the given radio signal is not transmitted in a given time window in a given frequency sub-band.

In one subembodiment, the given frequency sub-band is the first frequency sub-band, the given time window is the first time window, and the given radio signal is the first radio signal.

In one embodiment, the monitoring refers to coherent detection, which means performing coherent reception using an RS sequence of a DMRS for a physical layer channel where the given radio signal goes through, and measuring energy of a signal obtained by the coherent reception. When the energy of the signal obtained by the coherent reception is greater than a first given threshold, it is determined that the given radio signal is transmitted in a given time window in a given frequency sub-band; otherwise, it is determined that the given radio signal is not transmitted in a given time window in a given frequency sub-band.

In one subembodiment, the given frequency sub-band is the first frequency sub-band, the given time window is the first time window, and the given radio signal is the first radio signal.

In one embodiment, the monitoring refers to energy detection, which means sensing energy of a radio signal and averages in time to acquire a received energy. When the received energy is greater than a second given threshold, it is determined that a given radio signal is transmitted in a given time window in a given frequency sub-band; otherwise, it is determined that the given radio signal is not transmitted in a given time window in a given frequency sub-band.

In one subembodiment, the given frequency sub-band is the first frequency sub-band, the given time window is the first time window, and the given radio signal is the first radio signal.

In one embodiment, the monitoring refers to coherent detection, which means performing coherent reception using a sequence of a given radio signal and measuring energy of a signal obtained by the coherent reception. When the energy of the signal obtained by the coherent reception is greater than a third given threshold, it is determined that the given radio signal is transmitted in a given time window in a given frequency sub-band; otherwise, it is determined that the given radio signal is not transmitted in a given time window in a given frequency sub-band.

In one subembodiment, the given frequency sub-band is the first frequency sub-band, the given time window is the first time window, and the given radio signal is the first radio signal.

In one embodiment, a given node determines based on the energy of a received signal whether a given radio signal is to be transmitted in a given time window in a given frequency sub-band.

In one subembodiment, the given node is the base station.

In one subembodiment, the given frequency sub-band is the first frequency sub-band, the given time window is the first time window, and the given radio signal is the first radio signal.

In one subembodiment, when the energy of a received signal is lower, the given node deems that the given radio signal is not transmitted in a given time window in a given frequency sub-band, otherwise, the given node deems that the given radio signal is transmitted in the given time window in the given frequency sub-band.

In one subembodiment, when the energy of a received signal is lower than a reference energy threshold, the given node deems that the given radio signal is not transmitted in a given time window in a given frequency sub-band, otherwise, the given node deems that the given radio signal is transmitted in the given time window in the given frequency sub-band; the reference energy threshold is autonomously configured by the given node.

In one embodiment, a given node determines based on the power of a received signal whether a given radio signal is to be transmitted in a given time window in a given frequency sub-band.

In one subembodiment, the given node is the base station.

In one subembodiment, the given frequency sub-band is the first frequency sub-band, the given time window is the first time window, and the given radio signal is the first radio signal.

In one subembodiment, when the power of a received signal is lower, the given node deems that the given radio signal is not transmitted in a given time window in a given frequency sub-band, otherwise, the given node deems that the given radio signal is transmitted in the given time window in the given frequency sub-band.

In one subembodiment, when the power of a received signal is lower than a reference power threshold, the given node deems that the given radio signal is not transmitted in a given time window in a given frequency sub-band, otherwise, the given node deems that the given radio signal is transmitted in the given time window in the given frequency sub-band; the reference power threshold is autonomously configured by the given node.

In one embodiment, a given node determine whether the given radio signal is to be transmitted in a given time window in a given frequency sub-band based on correlation between a received signal and the given radio signal.

In one subembodiment, the given node is the base station.

In one subembodiment, the given frequency sub-band is the first frequency sub-band, the given time window is the first time window, and the given radio signal is the first radio signal.

In one subembodiment, when the correlation between a received signal and the given radio signal is lower, the given node deems that the given radio signal is not transmitted in a given time window in a given frequency sub-band, otherwise, the given node deems that the given radio signal is transmitted in the given time window in the given frequency sub-band.

In one subembodiment, when the correlation between a received signal and the given radio signal is lower than a reference correlation threshold, the given node deems that the given radio signal is not transmitted in a given time window in a given frequency sub-band, otherwise, the given node deems that the given radio signal is transmitted in the given time window in the given frequency sub-band; the reference correlation threshold is autonomously configured by the given node.

In one embodiment, a given node measures a received signal based on parameters of configuration of a given radio signal to estimate a channel, and then determines based on the estimated channel whether the given radio signal is to be transmitted in a given time window in a given frequency sub-band.

In one subembodiment, the given node is the base station.

In one subembodiment, the given frequency sub-band is the first frequency sub-band, the given time window is the first time window, and the given radio signal is the first radio signal.

In one subembodiment, when energy of the estimated channel is lower, the given node deems that the given radio signal is not transmitted in a given time window in a given frequency sub-band, otherwise, the given node deems that the given radio signal is transmitted in the given time window in the given frequency sub-band.

In one subembodiment, when energy of the estimated channel is lower than a reference channel energy threshold, the given node deems that the given radio signal is not transmitted in a given time window in a given frequency sub-band, otherwise, the given node deems that the given radio signal is transmitted in the given time window in the given frequency sub-band; the reference channel energy threshold is autonomously configured by the given node.

In one subembodiment, when power of the estimated channel is lower, the given node deems that the given radio signal is not transmitted in a given time window in a given frequency sub-band, otherwise, the given node deems that the given radio signal is transmitted in the given time window in the given frequency sub-band.

In one subembodiment, when power of the estimated channel is lower than a reference channel power threshold, the given node deems that the given radio signal is not transmitted in a given time window in a given frequency sub-band, otherwise, the given node deems that the given radio signal is transmitted in the given time window in the given frequency sub-band; the reference channel power threshold is autonomously configured by the given node.

In one subembodiment, when properties of the estimated channel are not consistent with those supposed by the given node, the given node deems that the given radio signal is not transmitted in a given time window in a given frequency sub-band, otherwise, the given node deems that the given radio signal is transmitted in the given time window in the given frequency sub-band.

In one embodiment, S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

In one embodiment, W start time(s) comprises(comprise) start time(s) respectively corresponding to N1 time unit(s) out of the N time units, N1 being related to the SCS of the subcarriers occupied by the first radio signal, and N1 being a positive integer no greater than the N.

In one embodiment, the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively.

In one embodiment, the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; there are two start times respectively belonging to two of the M subsets and also to a same time unit of the N time units.

In one embodiment, a first subset is any subset of the M subsets that comprises more than one start time, and a time offset between any two start times in the first subset is equal to a positive integral multiple of a first time offset.

In one embodiment, a number of bits comprised in the second information is unrelated to the SCS of the subcarriers occupied by the first radio signal.

In one embodiment, a number of bits comprised in the second information is related to the SCS of the subcarriers occupied by the first radio signal.

Embodiment 6

Figure 6A:
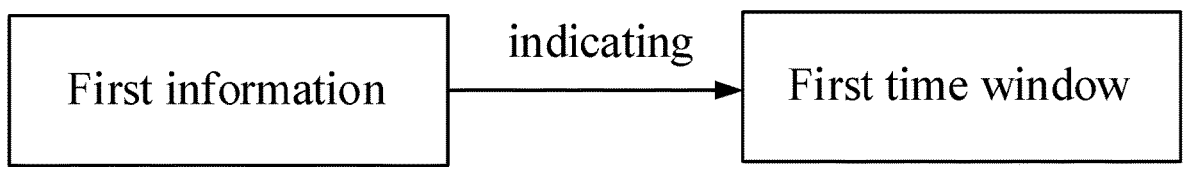
FIG. 6A-FIG. 6B respectively illustrate a schematic diagram of first information being used to determine a first time window according to one embodiment of the present disclosure.
Figure 6B:
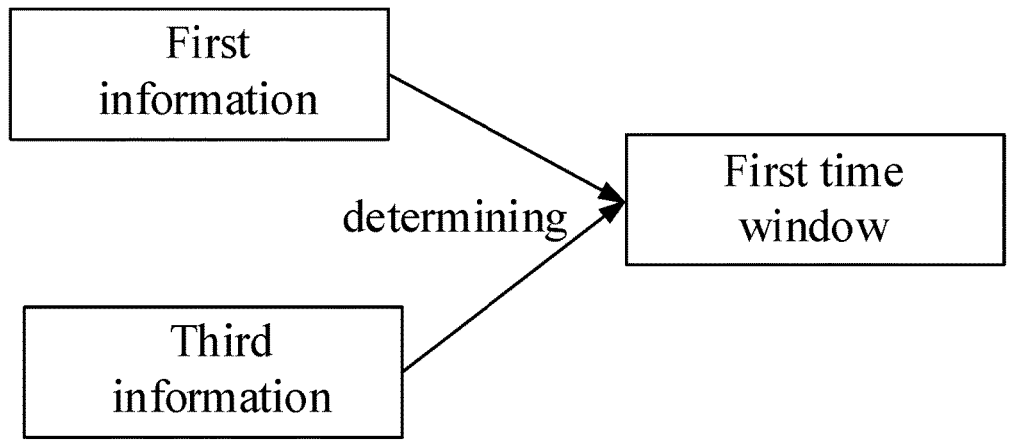

Embodiment 6A-Embodiment 6B respectively illustrate a schematic diagram of first information being used to determine a first time window, as shown in FIG. 6.

In Embodiment 6A, the first information is used for indicating the first time window.

In Embodiment 6B, the first information and the third information are jointly used for determining the first time window.

In one embodiment, the first information is used for indicating the first time window.

In one subembodiment, the first information explicitly indicates the first time window.

In one subembodiment, the first information implicitly indicates the first time window.

In one subembodiment, the first information explicitly indicates T time window(s), and the first time window is one of the T time window(s), T being a positive integer.

In one subembodiment, the first information implicitly indicates T time window(s), and the first time window is one of the T time window(s), T being a positive integer.

In one subembodiment, the first information indicates a period and a time-domain offset, and the period and the time-domain offset indicated are used for determining T time window(s), wherein the T time window(s) composes(compose) a group of periodically occurring time window(s), and the first time window is one of the T time window(s), T being a positive integer.

In one subembodiment, the first information comprises a first bit string, the first bit string comprising T1 bit(s), and the T1 bit(s) comprised by the first bit string respectively corresponding to T1 time window(s); the first time window is one of T time window(s), and the T time window(s) is(are) a subset of the T1 time window(s), T being a positive integer and T1 being a positive integer no less than the T; for any given bit in the first bit string, when the any given bit is equal to 1, a time window of the T1 time window(s) corresponding to the any given bit is one of the T time window(s); or when the any given bit is equal to 0, a time window of the T1 time window(s) corresponding to the any given bit is not any of the T time window(s).

In one subembodiment, the first information comprises a second bit string, the first bit string comprising T2 bit(s), any bit of the T2 bit(s) corresponds to at least one of T3 time window(s), and any of the T3 time window(s) corresponds to one of the T2 bit(s), T2 being a positive integer and T3 being a positive integer no less than the T2; the first time window is one of T time window(s), and each of the T time window(s) is a time window of the T3 time window(s), T being a positive integer no greater than the T3; for any given bit in the second bit string, when the any given bit is equal to 1, each of the T3 time window(s) that corresponds to the any given bit is a time window of the T time window(s); or when the any given bit is equal to 0, each of the T3 time window(s) that corresponds to the any given bit is not a time window of the T time window(s).

In one subembodiment of the above embodiment, the first information is semi-statically configured.

In one subembodiment of the above embodiment, the first information is carried by a higher-layer signaling.

In one subembodiment of the above embodiment, the first information is carried by a Radio Resource Control (RRC) signaling.

In one subembodiment of the above embodiment, the first information is carried by a MAC CE signaling.

In one subembodiment of the above embodiment, the first information comprises one or more Information Elements (IEs) in an RRC signaling.

In one subembodiment of the above embodiment, the first information comprises all or part of an IE in an RRC signaling.

In one subembodiment of the above embodiment, the first information comprises some fields of an IE in an RRC signaling.

In one subembodiment of the above embodiment, the first information comprises multiple IEs in an RRC signaling.

In one subembodiment of the above embodiment, the first information comprises all or part of fields of a ConfiguredGrantConfig IE in an RRC signaling, and the detailed definition of the ConfiguredGrantConfig IE can be found in 3GPP TS38.331, section 6.3.2.

In one subembodiment of the above embodiment, the first information comprises a periodicity field and a timeDomainOffset field of a ConfiguredGrantConfig IE in an RRC signaling, and the detailed definition of the periodicity field and the timeDomainOffset field can be found in 3GPP TS38.331, section 6.3.2.

In one embodiment, the first information and third information are jointly used for determining the first time window.

In one subembodiment, the first information and third information are jointly used for indicating T time window(s), and the first time window is one of the T time window(s), T being a positive integer.

In one subembodiment, the first time window is one of the T time window(s), T being a positive integer; the T time window(s) composes(compose) a group of periodically occurring time window(s); the third information indicates a period of the T time window(s) while the first information indicates an earliest time window of the N time windows.

In one subembodiment, the first time window is one of the T time window(s), T being a positive integer; the T time window(s) composes(compose) a group of periodically occurring time window(s); the third information indicates a period of the T time window(s) while the first information comprises a time-domain offset of an earliest one of the N time windows relative to a time-domain resource unit transmitting the first information.

In one subembodiment, the third information indicates T1 time window(s), while the first information is used for determining T time window(s) of the T1 time window(s), and the first time window is one of the T time window(s), T being a positive integer and T1 being a positive integer no less than the T.

In one subembodiment, the third information indicates T1 time window(s), while the first information is used for determining the first time window, and the first time window is one of the T1 time window(s), T1 being a positive integer.

In one subembodiment, the third information indicates T1 time window(s), while the first information is used for determining T time window(s) of the T1 time window(s), and the first time window is one of the T time window(s), T being a positive integer and T1 being a positive integer no less than the T.

In one subembodiment, the third information comprises a third bit string, the third bit string comprising T4 bit(s), and the T4 bit(s) comprised by the third bit string respectively corresponding to T4 time window(s); T1 time window(s) is(are) a subset of the T4 time window(s), T1 being a positive integer no greater than T4; for any given bit in the third bit string, when the any given bit is equal to 1, a time window of the T4 time window(s) corresponding to the any given bit is one of the T1 time window(s); or when the any given bit is equal to 0, a time window of the T4 time window(s) corresponding to the any given bit is not any of the T1 time window(s); the first information is used for determining T time window(s) of the T1 time window(s), and the first time window is one of the T time window(s), T being a positive integer no greater than T1.

In one subembodiment, the third information comprises a third bit string, the third bit string comprising T4 bit(s), and the T4 bit(s) comprised by the third bit string respectively corresponding to T4 time window(s); T1 time window(s) is(are) a subset of the T4 time window(s), T1 being a positive integer no greater than T4; for any given bit in the third bit string, when the any given bit is equal to 1, a time window of the T4 time window(s) corresponding to the any given bit is one of the T1 time window(s); or when the any given bit is equal to 0, a time window of the T4 time window(s) corresponding to the any given bit is not any of the T1 time window(s); a start time for each of T time window(s) is later than an end time for a transmission of the first information, each of the T time window(s) being one of the T1 time window(s), and the first time window is one of the T time window(s), T being a positive integer no greater than T1.

In one subembodiment, the third information comprises a fourth bit string, the fourth bit string comprising T4 bit(s), any bit of the T4 bit(s) corresponds to at least one of T5 time window(s), and any of the T5 time window(s) corresponds to one of the T4 bit(s), T4 being a positive integer and T5 being a positive integer no less than the T4; T1 time window(s) is(are) a subset of the T5 time window(s), T1 being a positive integer no greater than the T5; for any given bit in the fourth bit string, when the any given bit is equal to 1, each of the T5 time window(s) that corresponds to the any given bit is one of the T1 time window(s); or when the any given bit is equal to 0, each of the T5 time window(s) that corresponds to the any given bit is not a time window of the T1 time window(s); the first information is used for determining T time window(s) of the T1 time window(s), and the first time window is one of the T time window(s), T being a positive integer no greater than T1.

In one subembodiment, the third information comprises a fourth bit string, the fourth bit string comprising T4 bit(s), any bit of the T4 bit(s) corresponds to at least one of T5 time window(s), and any of the T5 time window(s) corresponds to one of the T4 bit(s), T4 being a positive integer and T5 being a positive integer no less than the T4; T1 time window(s) is(are) a subset of the T5 time window(s), T1 being a positive integer no greater than the T5; for any given bit in the fourth bit string, when the any given bit is equal to 1, each of the T5 time window(s) that corresponds to the any given bit is one of the T1 time window(s); or when the any given bit is equal to 0, each of the T5 time window(s) that corresponds to the any given bit is not a time window of the T1 time window(s); a start time for each of T time window(s) is later than an end time for a transmission of the first information, each of the T time window(s) being one of the T1 time window(s), and the first time window is one of the T time window(s), T being a positive integer no greater than T1.

In one subembodiment, the first information is dynamically configured.

In one subembodiment, the first information is carried by a physical layer signaling.

In one subembodiment, the first information is carried by a DCI signaling.

In one subembodiment, the first information comprises one or more fields in a DCI signaling.

In one subembodiment, the first information comprises a field in a DCI signaling.

In one subembodiment, the first information comprises multiple fields in a DCI signaling.

In one subembodiment, the first information is carried by an UpLink Grant DCI signaling.

In one subembodiment, a CRC bit sequence of a DCI signaling carrying the first information is scrambled by a Configured Scheduling (CS)—Radio Network Temporary Identifier (RNTI).

In one subembodiment, a DCI signaling carrying the first information is DCI format 0_0 or DCI format 0_1, for the detailed definition of the DCI format 0_0 and the DCI format 0_1, refer to 3GPP TS38.212, section 7.3.1.1.

In one subembodiment, a DCI signaling carrying the first information is DCI format 0_0, for the detailed definition of the DCI format 0_0, refer to 3GPP TS38.212, section 7.3.1.1.

In one subembodiment, a DCI signaling carrying the first information is DCI format 0_1, for the detailed definition of the DCI format 0_1, refer to 3GPP TS38.212, section 7.3.1.1.

In one subembodiment, the first information comprises a Time domain resource assignment field in a DCI signaling, for the detailed definition of the Time domain resource assignment field, refer to 3GPP TS38.214, section 6.1.2.

In one embodiment, the third information is transmitted on a frequency band deployed at Unlicensed Spectrum.

In one embodiment, the third information is transmitted on a frequency band deployed at Licensed Spectrum.

In one embodiment, the third information is transmitted on the first frequency sub-band.

In one embodiment, the third information is transmitted on a frequency band other than the first frequency sub-band.

In one subembodiment, the third information is semi-statically configured.

In one subembodiment, the third information is carried by a higher-layer signaling.

In one subembodiment, the third information is carried by an RRC signaling.

In one subembodiment, the third information is carried by a MAC CE signaling.

In one subembodiment, the third information comprises one or more IEs in an RRC signaling.

In one subembodiment, the third information comprises all or part of an IE in an RRC signaling.

In one subembodiment, the third information comprises some fields of an IE in an RRC signaling.

In one subembodiment, the third information comprises multiple IEs in an RRC signaling.

In one subembodiment, the third information comprises all or part of fields of a ConfiguredGrantConfig IE in an RRC signaling, for the detailed definition of the ConfiguredGrantConfig IE, refer to 3GPP TS38.331, section 6.3.2.

In one subembodiment, the third information comprises a periodicity field in a ConfiguredGrantConfig IE in an RRC signaling, for the detailed definition of the ConfiguredGrantConfig IE, refer to 3GPP TS38.331, section 6.3.2.

In one embodiment, the third information is transmitted on a downlink physical layer data channel (i.e., a downlink channel capable of carrying physical layer data).

In one subembodiment, the third information is transmitted on a Physical Downlink Shared CHannel (PDSCH).

In one subembodiment, the third information is transmitted on a short PDSCH (sPDSCH).

In one subembodiment, the third information is transmitted on a New Radio PDSCH (NR-PDSCH).

In one subembodiment, the third information is transmitted on a Narrow Band PDSCH (NB-PDSCH).

Embodiment 7

Figure 7:
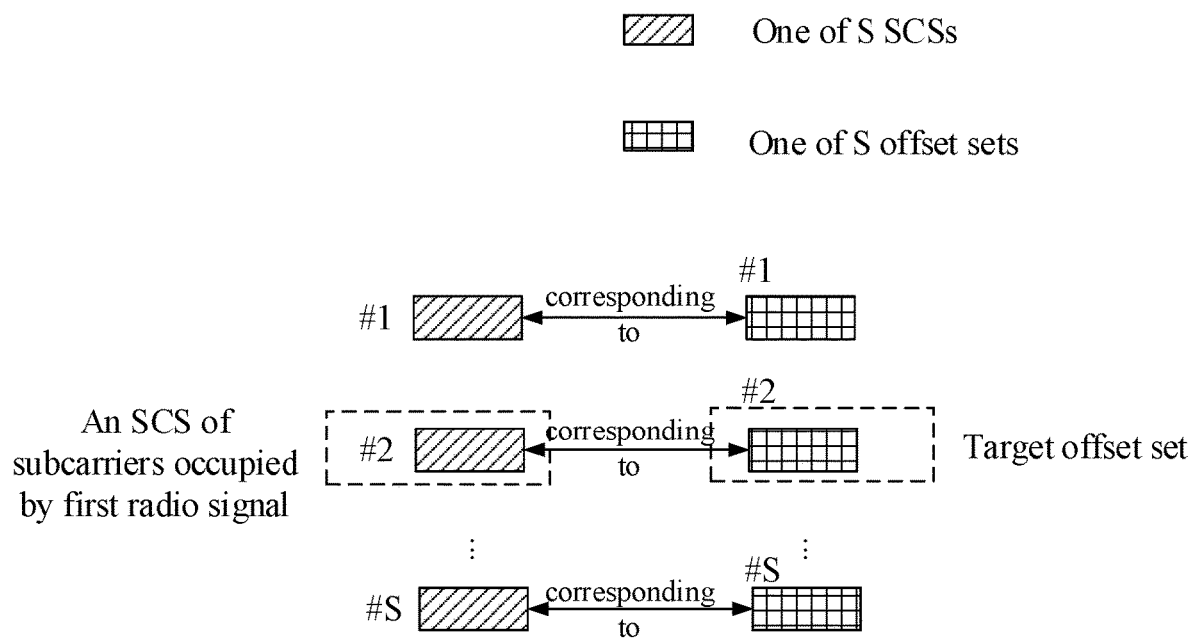
FIG. 7 illustrates a schematic diagram of relationship between S SCSs and S offset sets according to one embodiment of the present disclosure.

Embodiment 7 illustrates a schematic diagram of relationship between S SCSs and S offset sets, as shown in FIG. 7.

In one embodiment, S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

In one embodiment, between the N and the target offset set only the N is related to an SCS of subcarriers occupied by the first radio signal; any two offset sets of the S offset sets are the same.

In one embodiment, both the N and the target offset set are related to an SCS of subcarriers occupied by the first radio signal; there are two offset sets of the S offset sets that are different.

In one embodiment, both the N and the target offset set are related to an SCS of subcarriers occupied by the first radio signal; any two offset sets of the S offset sets are different.

In one embodiment, between the N and the target offset set only the target offset set is related to an SCS of subcarriers occupied by the first radio signal; there are two offset sets of the S offset sets that are different.

In one embodiment, between the N and the target offset set only the target offset set is related to an SCS of subcarriers occupied by the first radio signal; any two offset sets of the S offset sets are different.

In one embodiment, the S SCSs include at least two of 15 kHz, 30 kHz and 60 kHz.

In one embodiment, the S SCSs include 15 kHz, 30 kHz and 60 kHz.

In one embodiment, the S SCSs include 15 kHz and 30 kHz.

In one embodiment, the S SCSs include 15 kHz and 60 kHz.

In one embodiment, the S SCSs include 30 kHz and 60 kHz.

In one embodiment, any of the S offset sets comprises a positive integer number of offset value(s), and any offset value comprised in any of the S offset sets is a positive real number.

In one embodiment, any of the S offset sets comprises a positive integer number of offset value(s), and any offset value comprised in any of the S offset sets is a non-negative real number.

Embodiment 8

Embodiment 8 illustrates a schematic diagram of a target offset set, as shown in FIG. 8.

In Embodiment 8, between the N and the target offset set in the present disclosure, only the N is related to an SCS of subcarriers occupied by the first radio signal in the present disclosure; any two offset sets of the S offset sets in the present disclosure are the same.

In one embodiment, the W is unrelated to an SCS of subcarriers occupied by the first radio signal.

In one embodiment, the target offset set is unrelated to an SCS of subcarriers occupied by the first radio signal.

In one embodiment, when the SCS of the subcarriers occupied by the first radio signal is equal to a first SCS, the N is equal to a first reference value; when the SCS of the subcarriers occupied by the first radio signal is equal to a second SCS, the N is equal to a second reference value; the second SCS is larger than the first SCS, and the second reference value is greater than the first reference value.

In one subembodiment, the first SCS is 15 kHz and the first reference value is 2, while the second SCS is 30 kHz and the second reference value is 3.

In one subembodiment, the first SCS is 15 kHz and the first reference value is 2, while the second SCS is 60 kHz and the second reference value is 5.

In one subembodiment, the first SCS is 30 kHz and the first reference value is 3, while the second SCS is 60 kHz and the second reference value is 5.

In one embodiment, 15 kHz is one of the S SCSs, and one of the S offset sets that corresponds to 15 kHz comprises 16 μs, 25 μs, 34 μs, 43 μs, 52 μs, 61 μs and OS #1(15 kHz).

In one embodiment, 30 kHz is one of the S SCSs, and one of the S offset sets that corresponds to 30 kHz comprises 16 μs, 25 μs, 34 μs, 43 μs, 52 μs, 61 μs and OS #2(30 kHz).

In one embodiment, 60 kHz is one of the S SCSs, and one of the S offset sets that corresponds to 60 kHz comprises 16 μs, 25 μs, 34 μs, 43 μs, 52 μs, 61 μs and OS #4(60 kHz).

Embodiment 9

Embodiment 9 illustrates another schematic diagram of a target offset set, as shown in FIG. 9.

In Embodiment 9, between the N and the target offset set only the target offset set is related to an SCS of subcarriers occupied by the first radio signal.

In one embodiment, between the N and the target offset set only the target offset set is related to an SCS of subcarriers occupied by the first radio signal; there are two offset sets of the S offset sets that are different.

In one embodiment, between the N and the target offset set only the target offset set is related to an SCS of subcarriers occupied by the first radio signal; any two offset sets of the S offset sets are different.

In one embodiment, the W is related to an SCS of subcarriers occupied by the first radio signal.

In one embodiment, the N is unrelated to an SCS of subcarriers occupied by the first radio signal.

In one embodiment, when the SCS of the subcarriers occupied by the first radio signal is equal to a first SCS, the W is equal to a first target value; when the SCS of the subcarriers occupied by the first radio signal is equal to a second SCS, the W is equal to a second target value; the second SCS is larger than the first SCS, and the second target value is less than the first target value.

In one subembodiment, the first SCS is 15 kHz and the first target value is 7, while the second SCS is 30 kHz and the second target value is 3.

In one subembodiment, the first SCS is 15 kHz and the first target value is 7, while the second SCS is 60 kHz and the second target value is 2.

In one subembodiment, the first SCS is 30 kHz and the first target value is 3, while the second SCS is 60 kHz and the second target value is 2.

In one subembodiment, the first SCS is 15 kHz and the first target value is 7, while the second SCS is 60 kHz and the second target value is 1.

In one subembodiment, the first SCS is 30 kHz and the first target value is 3, while the second SCS is 60 kHz and the second target value is 1.

In one embodiment, 15 kHz is one of the S SCSs, and one of the S offset sets that corresponds to 15 kHz comprises 16 µs, 25 µs, 34 µs, 43 µs, 52 µs, 61 µs and OS #1(15 kHz), where the OS #1(15 kHz) is a duration of a multicarrier symbol with an SCS of 15 kHz.

In one embodiment, 30 kHz is one of the S SCSs, and one of the S offset sets that corresponds to 30 kHz comprises 16 µs, 25 µs and OS #1(30 kHz).

In one embodiment, 60 kHz is one of the S SCSs, and one of the S offset sets that corresponds to 60 kHz comprises 16 µs and OS #1(60 kHz).

In one embodiment, 60 kHz is one of the S SCSs, and one of the S offset sets that corresponds to 60 kHz comprises OS #1(60 kHz).

Embodiment 10

Embodiment 10 illustrates another schematic diagram of a target offset set, as shown in FIG. 10.

In Embodiment 10, the W start time(s) comprises(comprise) start time(s) respectively corresponding to N1 time unit(s) out of the N time units, N1 being unrelated to the SCS of the subcarriers occupied by the first radio signal, and N1 being a positive integer no greater than the N.

In one embodiment, both the N and the target offset set are related to the SCS of the subcarriers occupied by the first radio signal.

In one embodiment, the N1 is equal to 1.

In one embodiment, the N1 is greater than 1.

In one embodiment, a start time for any time unit of the N1 time unit(s) is one of the W start time(s).

In one embodiment, 15 kHz is one of the S SCSs, and one of the S offset sets that corresponds to 15 kHz comprises OS #1(15 kHz), OS #1(15 kHz)-9 µs, OS #1(15 kHz)-18 µs, OS #1(15 kHz)-27 µs, OS #1(15 kHz)-36 µs, OS #1(15 kHz)-45 µs, OS #1(15 kHz)-54 µs and OS #1(15 kHz)-63 µs.

In one embodiment, 15 kHz is one of the S SCSs, and one of the S offset sets that corresponds to 15 kHz comprises OS #1(15 kHz), OS #1(15 kHz)-9 µs, OS #1(15 kHz)-18 µs, OS #1(15 kHz)-27 µs, OS #1(15 kHz)-36 µs, OS #1(15 kHz)-45 µs and OS #1(15 kHz)-54 µs.

In one embodiment, 15 kHz is one of the S SCSs, and one of the S offset sets that corresponds to 15 kHz comprises OS #1(15 kHz), OS #1(15 kHz)-9 µs, OS #1(15 kHz)-18 µs, OS #1(15 kHz)-27 µs, OS #1(15 kHz)-36 µs and OS #1(15 kHz)-45 µs.

In one embodiment, 30 kHz is one of the S SCSs, and one of the S offset sets that corresponds to 30 kHz comprises OS #2(30 kHz), OS #2(30 kHz)-9 µs, OS #2(30 kHz)-18 µs, OS #2(30 kHz)-27 µs, OS #2(30 kHz)-36 µs, OS #2(30 kHz)-45 µs, OS #2(30 kHz)-54 µs and OS #2(30 kHz)-63 µs.

In one embodiment, 30 kHz is one of the S SCSs, and one of the S offset sets that corresponds to 30 kHz comprises OS #2(30 kHz), OS #2(30 kHz)-9 µs, OS #2(30 kHz)-18 µs, OS #2(30 kHz)-27 µs, OS #2(30 kHz)-36 µs, OS #2(30 kHz)-45 µs and OS #2(30 kHz)-54 µs.

In one embodiment, 30 kHz is one of the S SCSs, and one of the S offset sets that corresponds to 30 kHz comprises OS #2(30 kHz), OS #2(30 kHz)-9 µs, OS #2(30 kHz)-18 µs, OS #2(30 kHz)-27 µs, OS #2(30 kHz)-36 µs and OS #2(30 kHz)-45 µs.

In one embodiment, 60 kHz is one of the S SCSs, and one of the S offset sets that corresponds to 60 kHz comprises OS #4(60 kHz), OS #4(60 kHz)-9 µs, OS #4(60 kHz)-18 µs, OS #4(60 kHz)-27 µs, OS #4(60 kHz)-36 µs, OS #4(60 kHz)-45 µs, OS #4(60 kHz)-54 µs, OS #4(60 kHz)-63 µs.

In one embodiment, 60 kHz is one of the S SCSs, and one of the S offset sets that corresponds to 60 kHz comprises OS #4(60 kHz), OS #4(60 kHz)-9 µs, OS #4(60 kHz)-18 µs, OS #4(60 kHz)-27 µs, OS #4(60 kHz)-36 µs, OS #4(60 kHz)-45 µs and OS #4(60 kHz)-54 µs.

In one embodiment, 60 kHz is one of the S SCSs, and one of the S offset sets that corresponds to 60 kHz comprises OS #4(60 kHz), OS #4(60 kHz)-9 µs, OS #4(60 kHz)-18 µs, OS #4(60 kHz)-27 µs, OS #4(60 kHz)-36 µs and OS #4(60 kHz)-45 µs.

Embodiment 11

Embodiment 11 illustrates another schematic diagram of a target offset set, as shown in FIG. 11.

In Embodiment 11, the W start time(s) comprises(comprise) start time(s) respectively corresponding to N1 time unit(s) among the N time units, N1 being related to the SCS of the subcarriers occupied by the first radio signal, and N1 being a positive integer no greater than the N.

In one embodiment, both the N and the target offset set are related to an SCS of subcarriers occupied by the first radio signal.

In one embodiment, the W is unrelated to the SCS of the subcarriers occupied by the first radio signal.

In one embodiment, the W is related to the SCS of the subcarriers occupied by the first radio signal.

In one embodiment, the N1 is equal to the N.

In one embodiment, the N1 is less than the N.

In one embodiment, the N1 is equal to N−1.

In one embodiment, the N1 is less than the N, any time unit of the N1 time unit(s) is one of the N time units other than an earliest time unit.

In one embodiment, the N1 is equal to N−1, the N1 time unit(s) is(are) time unit(s) of the N time units other than an earliest time unit.

In one embodiment, when the SCS of the subcarriers occupied by the first radio signal is equal to a first SCS, the N1 is equal to a first value; when the SCS of the subcarriers occupied by the first radio signal is equal to a second SCS, the N1 is equal to a second value; the second SCS is larger than the first SCS, and the second value is greater than the first value.

In one subembodiment, the first SCS is 15 kHz and the first value is 1, while the second SCS is 30 kHz and the second value is 2.

In one subembodiment, the first SCS is 15 kHz and the first value is 1, while the second SCS is 60 kHz and the second value is 4.

In one subembodiment, the first SCS is 30 kHz and the first value is 2, while the second SCS is 60 kHz and the second value is 4.

In one embodiment, when the SCS of the subcarriers occupied by the first radio signal is equal to a first SCS, the N1 is equal to a first value; when the SCS of the subcarriers occupied by the first radio signal is equal to a second SCS, the N1 is equal to a second value; the second SCS is G times as large as the first SCS, and a quotient of the second value and the first value is equal to the G, the G being a positive integer greater than 1.

In one subembodiment, the first SCS is 15 kHz and the first value is 1, while the second SCS is 30 kHz and the second value is 2.

In one subembodiment, the first SCS is 15 kHz and the first value is 1, while the second SCS is 60 kHz and the second value is 4.

In one subembodiment, the first SCS is 30 kHz and the first value is 2, while the second SCS is 60 kHz and the second value is 4.

Embodiment 12

Figure 12:
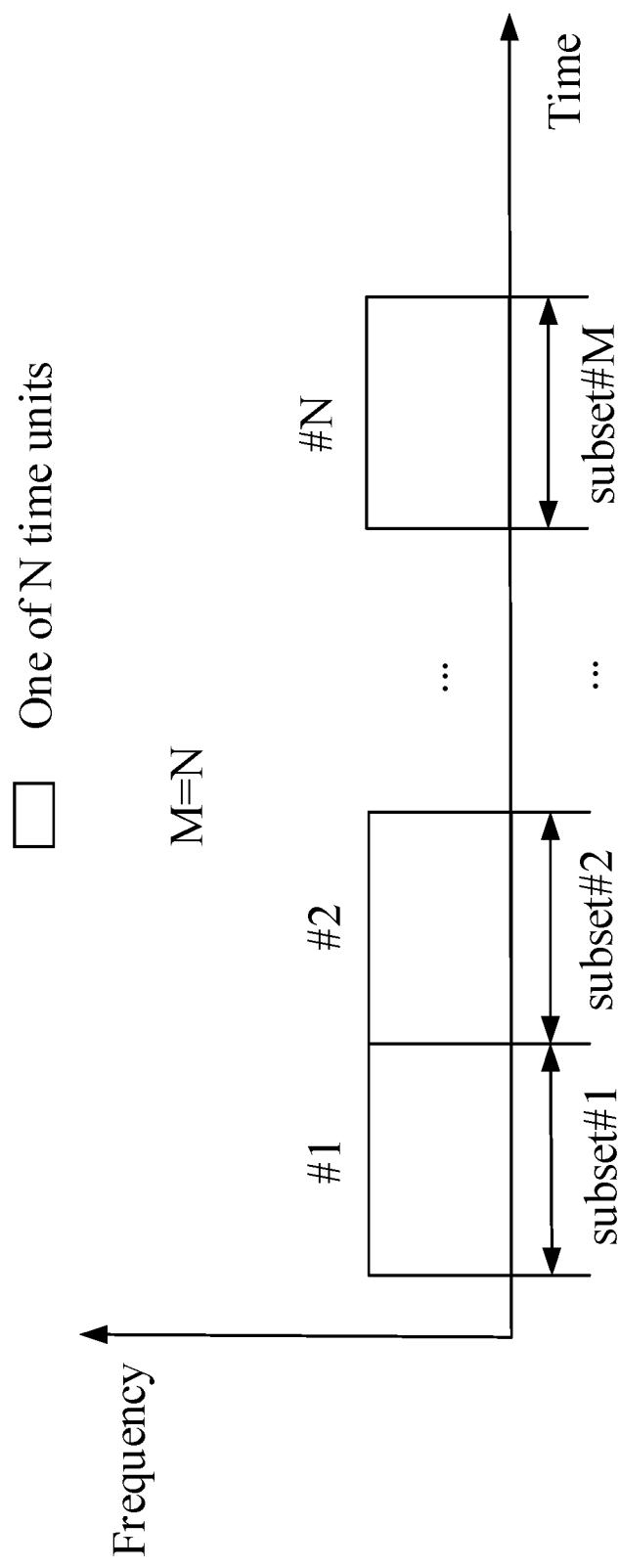
FIG. 12 illustrates a schematic diagram of relationship between M subsets and N time units according to one embodiment of the present disclosure.

Embodiment 12 illustrates a schematic diagram of relationship between M subsets and N time units, as shown in FIG. 12.

In Embodiment 12, the W start time(s) comprises(comprise) start time(s) respectively corresponding to N1 time unit(s) of the N time units, N1 being related to the SCS of the subcarriers occupied by the first radio signal, and N1 being a positive integer no greater than the N; the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively.

In one embodiment, any of the W start times belongs to only one subset of the M subsets.

In one embodiment, the M subsets respectively correspond to the N time units, and each start time comprised by any subset of the M subsets belongs to a corresponding time unit of the N time units.

In one embodiment, 15 kHz is one of the S SCSs, and the N1 is equal to 1, OS #1(15 kHz) belonging to the N1 subset.

In one subembodiment of the above embodiment, the M is greater than the N1.

In one subembodiment of the above embodiment, the M is equal to 2.

In one embodiment, 30 kHz is one of the S SCSs, and the N1 is equal to 2, OS #1(30 kHz) and OS #2(30 kHz) respectively belonging to the N1 subsets.

In one subembodiment of the above embodiment, the M is greater than the N1.

In one subembodiment of the above embodiment, the M is equal to 3.

In one embodiment, 60 kHz is one of the S SCSs, and the N1 is equal to 4; OS #1(60 kHz), OS #2(60 kHz), OS #3(60 kHz) and OS #4(60 kHz) respectively belong to the N1 subsets.

In one subembodiment of the above embodiment, the M is greater than the N1.

In one subembodiment of the above embodiment, the M is equal to the N1.

In one subembodiment of the above embodiment, the M is equal to 5.

In one embodiment, 15 kHz is one of the S SCSs, and one of the S offset sets that corresponds to 15 kHz comprises 16 μs, 25 μs, 34 μs, 43 μs, 52 μs, 61 μs and OS #1(15 kHz).

In one embodiment, the M is equal to 2, one of the M subsets comprising 16 μs, 25 μs, 34 μs, 43 μs, 52 μs and 61 μs and the other comprising OS #1(15 kHz).

In one embodiment, 30 kHz is one of the S SCSs, and one of the S offset sets that corresponds to 30 kHz comprises 16 μs, 25 μs, OS #1(30 kHz), OS #1(30 kHz)+9 μs, OS #1(30 kHz)+18 μs, OS #1(30 kHz)+27 μs and OS #2(30 kHz).

In one subembodiment, the M is equal to 3, the M subsets respectively comprising a collection of 16 μs and 25 μs, a collection of OS #1(30 kHz), OS #1(30 kHz)+9 μs, OS #1(30 kHz)+18 μs and OS #1(30 kHz)+27 μs, and OS #2(30 kHz).

In one embodiment, 60 kHz is one of the S SCSs, and one of the S offset sets that corresponds to 60 kHz comprises 16 μs, OS #1(60 kHz), OS #1(60 kHz)+9 μs, OS #2(60 kHz), OS #2(60 kHz)+9 μs, OS #3(60 kHz), OS #3(60 kHz)+9 μs and OS #4(60 kHz).

In one subembodiment, the M is equal to 5, the M subsets respectively comprising 16 μs, a collection of OS #1(60 kHz) and OS #1(60 kHz)+9 μs, a collection of OS #2(60 kHz) and OS #2(60 kHz)+9 μs, a collection of OS #3(60 kHz) and OS #3(60 kHz)+9 μs as well as OS #4(60 kHz).

In one embodiment, 60 kHz is one of the S SCSs, and one of the S offset sets that corresponds to 60 kHz comprises OS #1(60 kHz), OS #1(60 kHz)+9 μs, OS #2(60 kHz), OS #2(60 kHz)+9 μs, OS #3(60 kHz), OS #3(60 kHz)+9 μs and OS #4(60 kHz).

In one subembodiment, the M is equal to 4, the M subsets respectively comprising a collection of OS #1(60 kHz) and OS #1(60 kHz)+9 μs, a collection of OS #2(60 kHz) and OS #2(60 kHz)+9 μs, a collection of OS #3(60 kHz) and OS #3(60 kHz)+9 μs, and OS #4(60 kHz).

In one embodiment, 60 kHz is one of the S SCSs, and one of the S offset sets that corresponds to 60 kHz comprises OS #1(60 kHz), OS #2(60 kHz), OS #3(60 kHz) and OS #4(60 kHz).

In one subembodiment, the M is equal to 4, the M subsets respectively comprising OS #1(60 kHz), OS #2(60 kHz), OS #3(60 kHz) and OS #4(60 kHz).

In one embodiment, the OS #1(15 kHz) is a duration of a multicarrier symbol with an SCS of 15 kHz.

In one embodiment, the OS #1(30 kHz) is a duration of a multicarrier symbol with an SCS of 30 kHz.

In one embodiment, the OS #2(30 kHz) is a duration of two consecutive multiple symbols with an SCS of 30 kHz.

In one embodiment, the OS #1(60 kHz) is a duration of a multicarrier symbol with an SCS of 60 kHz.

In one embodiment, the OS #2(60 kHz) is a duration of two consecutive multiple symbols with an SCS of 60 kHz.

In one embodiment, the OS #3(60 kHz) is a duration of three consecutive multiple symbols with an SCS of 60 kHz.

In one embodiment, the OS #4(60 kHz) is a duration of four consecutive multiple symbols with an SCS of 60 kHz.

In one embodiment, the OS #1(15 kHz) is equal to 1/(15 kHz).

In one embodiment, the OS #1(15 kHz) is approximately equal to 66.7 μs.

In one embodiment, the OS #1(30 kHz) is equal to 1/(30 kHz).

In one embodiment, the OS #1(30 kHz) is approximately equal to 33.3 μs.

In one embodiment, the OS #2(30 kHz) is equal to 2/(30 kHz).

In one embodiment, the OS #2(30 kHz) is approximately equal to 66.7 μs.

In one embodiment, the OS #1(60 kHz) is equal to 1/(60 kHz).

In one embodiment, the OS #1(60 kHz) is approximately equal to 16.7 μs.

In one embodiment, the OS #2(60 kHz) is equal to 2/(60 kHz).

In one embodiment, the OS #2(60 kHz) is approximately equal to 33.3 μs.

In one embodiment, the OS #3(60 kHz) is equal to 3/(60 kHz).

In one embodiment, the OS #3(60 kHz) is approximately equal to 50 μs.

In one embodiment, the OS #4(60 kHz) is equal to 4/(60 kHz).

In one embodiment, the OS #4(60 kHz) is approximately equal to 66.7 μs.

Embodiment 13

Figure 13:
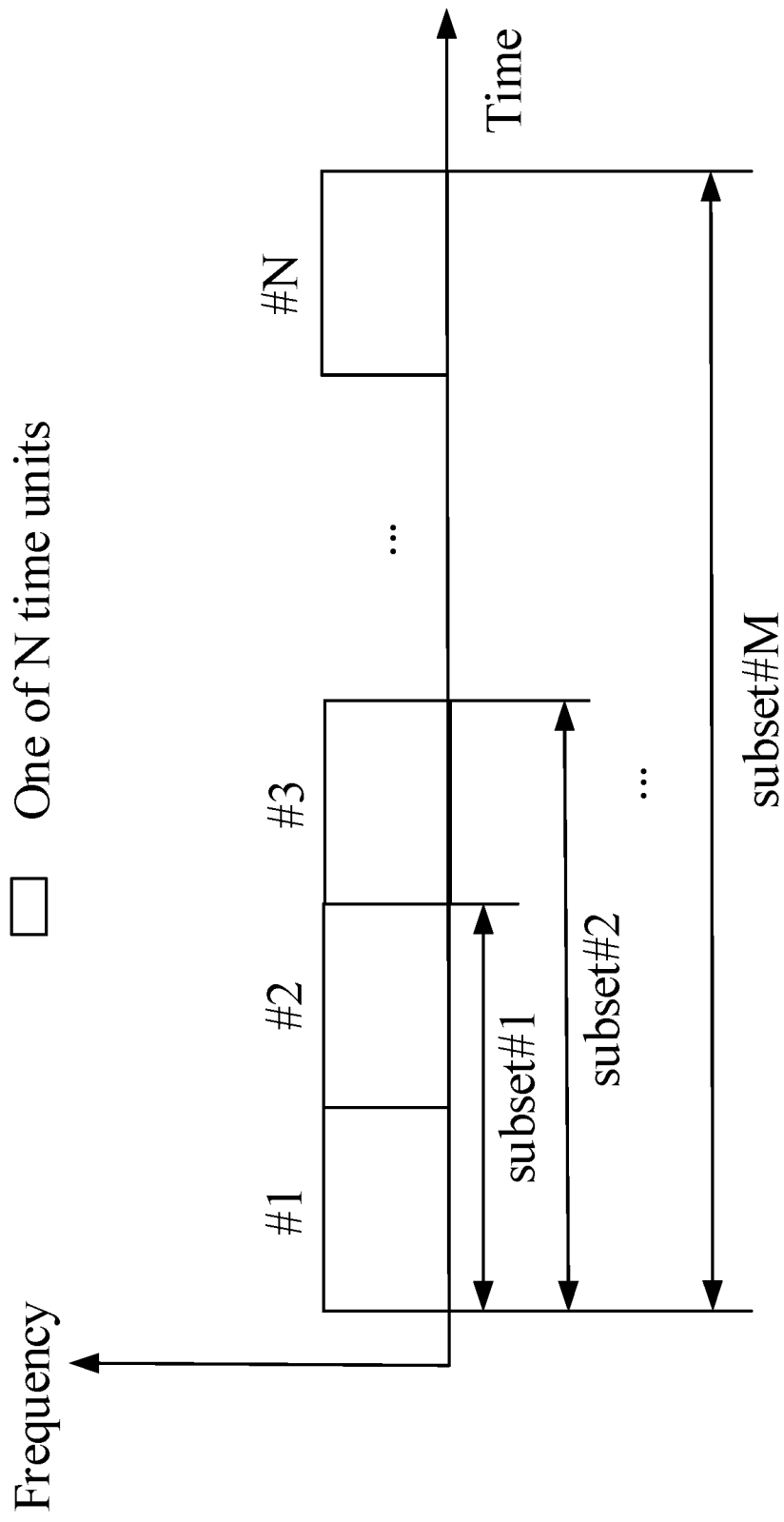
FIG. 13 illustrates a schematic diagram of relationship between M subsets and N time units according to another embodiment of the present disclosure.

Embodiment 13 illustrates another schematic diagram of relationship between M subsets and N time units, as shown in FIG. 13.

In Embodiment 13, the W start time(s) comprises(comprise) start time(s) respectively corresponding to N1 time unit(s) of the N time units, N1 being related to the SCS of the subcarriers occupied by the first radio signal, and N1 being a positive integer no greater than the N; the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; there are two start times respectively belonging to two of the M subsets and also to a same time unit of the N time units.

In one embodiment, any of the W start times belongs to only one subset of the M subsets.

In one embodiment, 15 kHz is one of the S SCSs, and the N1 is equal to 1, OS #1(15 kHz) belonging to the N1 subset.

In one embodiment, 30 kHz is one of the S SCSs, and the N1 is equal to 2, OS #1(30 kHz) and OS #2(30 kHz) respectively belonging to the N1 subsets.

In one embodiment, 60 kHz is one of the S SCSs, and the N1 is equal to 4; OS #1(60 kHz), OS #2(60 kHz), OS #3(60 kHz) and OS #4(60 kHz) respectively belong to the N1 subsets.

In one embodiment, the M is equal to the N1.

In one embodiment, 15 kHz is one of the S SCSs, and one of the S offset sets that corresponds to 15 kHz comprises OS #1(15 kHz), OS #1(15 kHz)-9 μs, OS #1(15 kHz)-18 μs, OS #1(15 kHz)-27 μs, OS #1(15 kHz)-36 μs, OS #1(15 kHz)-45 μs, OS #1(15 kHz)-54 μs and OS #1(15 kHz)-63 μs.

In one subembodiment of the above embodiment, the M is equal to 1, the M subset comprising OS #1(15 kHz), OS #1(15 kHz)-9 μs, OS #1(15 kHz)-18 μs, OS #1(15 kHz)-27 μs, OS #1(15 kHz)-36 μs, OS #1(15 kHz)-45 μs, OS #1(15 kHz)-54 μs and OS #1(15 kHz)-63 μs.

In one embodiment, 15 kHz is one of the S SCSs, and one of the S offset sets that corresponds to 15 kHz comprises OS #1(15 kHz), OS #1(15 kHz)-9 μs, OS #1(15 kHz)-18 μs, OS #1(15 kHz)-27 μs, OS #1(15 kHz)-36 μs, OS #1(15 kHz)-45 μs and OS #1(15 kHz)-54 μs.

In one subembodiment of the above embodiment, the M is equal to 1, the M subset comprising OS #1(15 kHz), OS #1(15 kHz)-9 μs, OS #1(15 kHz)-18 μs, OS #1(15 kHz)-27 μs, OS #1(15 kHz)-36 μs, OS #1(15 kHz)-45 μs and OS #1(15 kHz)-54 μs.

In one embodiment, 15 kHz is one of the S SCSs, and one of the S offset sets that corresponds to 15 kHz comprises OS #1(15 kHz), OS #1(15 kHz)-9 μs, OS #1(15 kHz)-18 μs, OS #1(15 kHz)-27 μs, OS #1(15 kHz)-36 μs and OS #1(15 kHz)-45 μs.

In one subembodiment of the above embodiment, the M is equal to 1, the M subset comprising OS #1(15 kHz), OS #1(15 kHz)-9 μs, OS #1(15 kHz)-18 μs, OS #1(15 kHz)-27 μs, OS #1(15 kHz)-36 μs and OS #1(15 kHz)-45 μs.

In one embodiment, 30 kHz is one of the S SCSs, and one of the S offset sets that corresponds to 30 kHz comprises OS #1(30 kHz), OS #1(30 kHz)-9 μs, OS #1(30 kHz)-18 μs, OS #1(30 kHz)-27 μs, OS #2(30 kHz), OS #2(30 kHz)-9 μs, OS #2(30 kHz)-18 μs, OS #2(30 kHz)-27 μs, OS #2(30 kHz)-36 μs, OS #2(30 kHz)-45 μs, OS #2(30 kHz)-54 μs and OS #2(30 kHz)-63 μs.

In one subembodiment of the above embodiment, the M is equal to 2, the M subsets respectively comprising a collection of OS #1(30 kHz), OS #1(30 kHz)-9 μs, OS #1(30 kHz)-18 μs and OS #1(30 kHz)-27 μs, and a collection of OS #2(30 kHz), OS #2(30 kHz)-9 μs, OS #2(30 kHz)-18 μs, OS #2(30 kHz)-27 μs, OS #2(30 kHz)-36 μs, OS #2(30 kHz)-45 μs, OS #2(30 kHz)-54 μs and OS #2(30 kHz)-63 μs.

In one embodiment, 30 kHz is one of the S SCSs, and one of the S offset sets that corresponds to 30 kHz comprises OS #1(30 kHz), OS #1(30 kHz)-9 μs, OS #1(30 kHz)-18 μs, OS #2(30 kHz), OS #2(30 kHz)-9 μs, OS #2(30 kHz)-18 μs, OS #2(30 kHz)-27 μs, OS #2(30 kHz)-36 μs, OS #2(30 kHz)-45 μs and OS #2(30 kHz)-54 μs.

In one subembodiment of the above embodiment, the M is equal to 2, the M subsets respectively comprising a collection of OS #1(30 kHz), OS #1(30 kHz)-9 μs, OS #1(30 kHz)-18 μs, OS #2(30 kHz), OS #2(30 kHz)-9 μs and OS #2(30 kHz)-18 μs, and a collection of OS #2(30 kHz), OS #2(30 kHz)-9 μs, OS #2(30 kHz)-18 μs, OS #2(30 kHz)-27 μs, OS #2(30 kHz)-36 μs, OS #2(30 kHz)-45 μs and OS #2(30 kHz)-54 μs.

In one embodiment, 30 kHz is one of the S SCSs, and one of the S offset sets that corresponds to 30 kHz comprises OS #1(30 kHz), OS #1(30 kHz)-9 μs, OS #2(30 kHz), OS #2(30 kHz)-9 μs, OS #2(30 kHz)-18 μs, OS #2(30 kHz)-27 μs, OS #2(30 kHz)-36 μs and OS #2(30 kHz)-45 μs.

In one subembodiment of the above embodiment, the M is equal to 2, the M subsets respectively comprising a collection of OS #1(30 kHz) and OS #1(30 kHz)-9 μs, and a collection of OS #2(30 kHz), OS #2(30 kHz)-9 μs, OS #2(30 kHz)-18 μs, OS #2(30 kHz)-27 μs, OS #2(30 kHz)-36 μs and OS #2(30 kHz)-45 μs.

In one embodiment, 60 kHz is one of the S SCSs, and one of the S offset sets that corresponds to 60 kHz comprises OS #1(60 kHz), OS #1(60 kHz)-9 μs, OS #2(60 kHz), OS #2(60 kHz)-9 μs, OS #2(60 kHz)-18 μs, OS #2(60 kHz)-27 μs, OS

3(60 kHz), OS #3(60 kHz)-9 μs, OS #3(60 kHz)-18 μs, OS #3(60 kHz)-27 μs, OS #3(60 kHz)-36 μs, OS #3(60 kHz)-45 μs, OS #4(60 kHz), OS #4(60 kHz)-9 μs, OS #4(60 kHz)-18 μs, OS #4(60 kHz)-27 μs, OS #4(60 kHz)-36 μs, OS #4(60 kHz)-45 μs, OS #4(60 kHz)-54 μs, and OS #4(60 kHz)-63 μs.

In one subembodiment of the above embodiment, the M is equal to 4, the M subsets respectively comprising a collection of OS #1(60 kHz) and OS #1(60 kHz)-9 μs, a collection of OS #2(60 kHz), OS #2(60 kHz)-9 μs, OS #2(60 kHz)-18 μs and OS #2(60 kHz)-27 μs, a collection of OS #3(60 kHz), OS #3(60 kHz)-9 μs, OS #3(60 kHz)-18 μs, OS #3(60 kHz)-27 μs, OS #3(60 kHz)-36 μs, OS #3(60 kHz)-45 μs and OS #4(60 kHz), and a collection of OS #4(60 kHz), OS #4(60 kHz)-9 μs, OS #4(60 kHz)-18 μs, OS #4(60 kHz)-27 μs, OS #4(60 kHz)-36 μs, OS #4(60 kHz)-45 μs, OS #4(60 kHz)-54 μs, and OS #4(60 kHz)-63 μs.

In one embodiment, 60 kHz is one of the S SCSs, and one of the S offset sets that corresponds to 60 kHz comprises OS #1(60 kHz), OS #2(60 kHz), OS #2(60 kHz)-9 μs, OS #2(60 kHz)-18 μs, OS #3(60 kHz), OS #3(60 kHz)-9 μs, OS #3(60 kHz)-18 μs, OS #3(60 kHz)-27 μs, OS #3(60 kHz)-36 μs, OS #4(60 kHz), OS #4(60 kHz)-9 μs, OS #4(60 kHz)-18 μs, OS #4(60 kHz)-27 μs, OS #4(60 kHz)-36 μs, OS #4(60 kHz)-45 μs and OS #4(60 kHz)-54 μs.

In one subembodiment of the above embodiment, the M is equal to 4, the M subsets respectively comprising OS #1(60 kHz), a collection of OS #2(60 kHz), OS #2(60 kHz)-9 μs and OS #2(60 kHz)-18 μs, a collection of OS #3(60 kHz), OS #3(60 kHz)-9 μs, OS #3(60 kHz)-18 μs, OS #3(60 kHz)-27 μs and OS #3(60 kHz)-36 μs, and a collection of OS #4(60 kHz), OS #4(60 kHz)-9 μs, OS #4(60 kHz)-18 μs, OS #4(60 kHz)-27 μs, OS #4(60 kHz)-36 μs, OS #4(60 kHz)-45 μs and OS #4(60 kHz)-54 μs.

In one embodiment, 60 kHz is one of the S SCSs, and one of the S offset sets that corresponds to 60 kHz comprises OS #1(60 kHz), OS #2(60 kHz), OS #2(60 kHz)-9 μs, OS #3(60 kHz), OS #3(60 kHz)-9 μs, OS #3(60 kHz)-18 μs, OS #3(60 kHz)-27 μs, OS #4(60 kHz), OS #4(60 kHz)-9 μs, OS #4(60 kHz)-18 μs, OS #4(60 kHz)-27 μs, OS #4(60 kHz)-36 μs and OS #4(60 kHz)-45 μs.

In one subembodiment of the above embodiment, the M is equal to 4, the M subsets respectively comprising OS #1(60 kHz), a collection of OS #2(60 kHz) and OS #2(60 kHz)-9 μs, a collection of OS #3(60 kHz), OS #3(60 kHz)-9 μs, OS #3(60 kHz)-18 μs and OS #3(60 kHz)-27 μs, and a collection of OS #4(60 kHz), OS #4(60 kHz)-9 μs, OS #4(60 kHz)-18 μs, OS #4(60 kHz)-27 μs, OS #4(60 kHz)-36 μs and OS #4(60 kHz)-45 μs.

Embodiment 14

Figure 14:
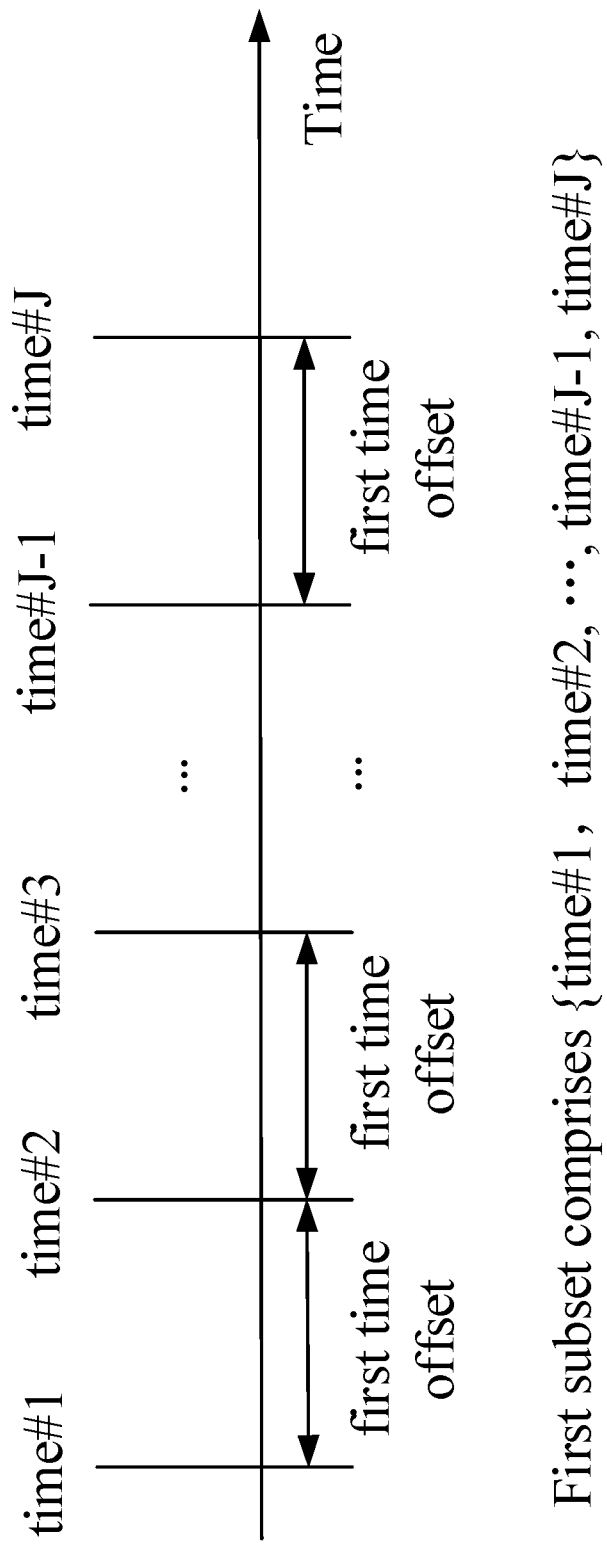
FIG. 14 illustrates a schematic diagram of M subsets according to one embodiment of the present disclosure.

Embodiment 14 illustrates a schematic diagram of M subsets, as shown in FIG. 14.

In Embodiment 14, a first subset is any subset of the M subsets that comprises more than one start time, and a time offset between any two start times in the first subset is equal to a positive integral multiple of a first time offset.

In one embodiment, the first time offset is pre-defined or configurable.

In one embodiment, the first time offset is pre-defined.

In one embodiment, the first time offset is configurable.

In one embodiment, the first time offset is a time duration of a slot duration.

In one embodiment, the first time offset is a time duration of a time unit corresponding to an energy detection.

In one embodiment, the first time offset is a time duration of a time sub-pool in the first access detection.

In one embodiment, the first time offset is a time duration of a time sub-pool in a given access detection.

In one embodiment, the first time offset is equal to 9 μs.

In one embodiment, a time offset between any two start times in the first subset that are adjacent in time domain is equal to the first time offset.

Embodiment 15

Embodiment 15 illustrates a schematic diagram of relationship between second information and an SCS of subcarriers occupied by the first radio signal, as shown in FIG. 15.

In Embodiment 15, a number of bits comprised in the second information is related to the SCS of the subcarriers occupied by the first radio signal.

In one embodiment, the N is related to the SCS of the subcarriers occupied by the first radio signal, and the second information is used for indicating a time unit to which a start time for a transmission of the first radio signal belongs from the N time units.

In one embodiment, the N is related to the SCS of the subcarriers occupied by the first radio signal, and a number of bits comprised in the second information is related to the N.

In one subembodiment, the number of bits comprised in the second information is equal to the N.

In one subembodiment, the number of bits comprised in the second information is equal to $\lceil \log_2 N \rceil$.

In one embodiment, when the SCS of the subcarriers occupied by the first radio signal is equal to a first SCS, the N is equal to a first reference value, and a number of bits comprised in the second information is equal to a first bit number; when the SCS of the subcarriers occupied by the first radio signal is equal to a second SCS, the N is equal to a second reference value, and a number of bits comprised in the second information is equal to a second bit number; the second SCS is larger than the first SCS, and the second reference value is greater than the first reference value and the second bit number is greater than the first bit number.

In one subembodiment, the first SCS is 15 kHz, the first reference value is 2, and the first bit number is 2; the second SCS is 30 kHz, the second reference value is 3, and the second bit number is 3.

In one subembodiment, the first SCS is 15 kHz, the first reference value is 2, and the first bit number is 1; the second SCS is 30 kHz, the second reference value is 3, and the second bit number is 2.

In one subembodiment, the first SCS is 15 kHz, the first reference value is 2, and the first bit number is 2; the second SCS is 60 kHz, the second reference value is 5, and the second bit number is 5.

In one subembodiment, the first SCS is 15 kHz, the first reference value is 2, and the first bit number is 1; the second SCS is 60 kHz, the second reference value is 5, and the second bit number is 3.

In one subembodiment, the first SCS is 30 kHz, the first reference value is 3, and the first bit number is 3; the second SCS is 60 kHz, the second reference value is 5, and the second bit number is 5.

In one subembodiment, the first SCS is 30 kHz, the first reference value is 3, and the first bit number is 2; the second SCS is 60 kHz, the second reference value is 5, and the second bit number is 3.

Embodiment 16

Figure 16:
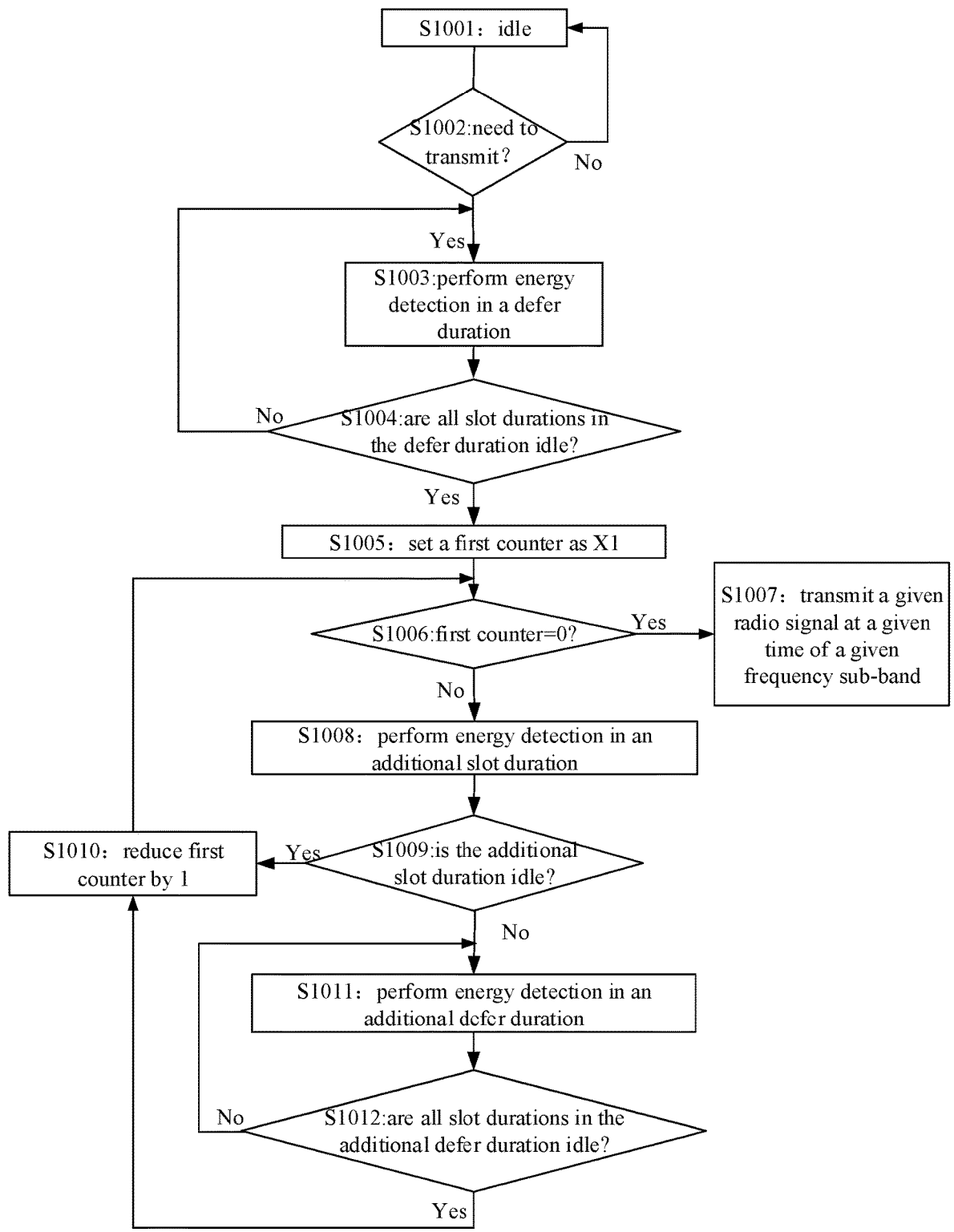
FIG. 16 illustrates a schematic diagram of a given access detection performed on a given frequency sub-band being used to determine whether a given radio signal starts to be transmitted at a given time of the given frequency sub-band according to one embodiment of the present disclosure.

Embodiment 16 illustrates a schematic diagram of a given access detection performed on a given frequency sub-band being used to determine whether a given radio signal starts to be transmitted at a given time of the given frequency sub-band, as shown in FIG. 16.

In Embodiment 16, the given access detection comprises performing X energy detection(s) respectively in X time sub-pool(s) of the given frequency sub-band to obtain X detection value(s), X being a positive integer; an end time for the X time sub-pool(s) is no later than the given time. The given access detection corresponds to the first access detection of the present disclosure, the given time corresponds to the start time for a transmission of the first radio signal in the present disclosure, and the given frequency sub-band corresponds to the first frequency sub-band in the present disclosure, and the X corresponds to the Q in the present disclosure. The process of the given access detection may be depicted by the flowchart in FIG. 16.

In FIG. 16, the base station in the present disclosure is idle in step S1001 and determines whether there is need to transmit in step S1002; performs energy detection in a defer duration in step S1003; and determines in step S1004 whether all slot durations within the defer duration are idle, if yes, move forward to step S1005 to set a first counter as X1, wherein the X1 is an integer no greater than the X; otherwise, go back to step S1004; the base station determines whether the first counter is 0 in step S1006, if yes, move forward to step S1007 to transmit the given radio signal at the given time of the given frequency sub-band; otherwise, move forward to step S1008 to perform energy detection in an additional slot duration; the base station determines in step S1009 whether the additional slot duration is idle, if yes, move forward to step S1010 to reduce the first counter by 1 and then go back to step S1006; otherwise, move forward to step S1011 to perform energy detection in an additional defer duration; the base station determines in step S1012 whether all slot durations within the additional defer duration are idle, if yes, move back to step S1010; otherwise go back to step S1011.

In Embodiment 16, the first counter in FIG. 16 is cleared to 0 ahead of the given time, when a result of the given access detection is that a channel is idle, a radio signal can be transmitted at the given time; when the result of the given access detection is that a channel is not idle, no radio signal can be transmitted at the given time. The condition for clearing the first counter is that each of X1 detection value(s) of the X detection value(s) respectively corresponding to X1 time sub-pool(s) of the X time sub-pool(s) is lower than a first reference threshold; a start time for the X1 time sub-pool(s) is behind the step S1005 in FIG. 16. The X1 corresponds to the Q1 in the present disclosure.

In one embodiment, an end time for the given access detection is no later than the given time.

In one embodiment, an end time for the given access detection is earlier than the given time.

In one embodiment, the X time sub-pool(s) comprises (comprise) all defer durations in FIG. 16.

In one embodiment, the X time sub-pool(s) comprises (comprise) part of defer durations in FIG. 16.

In one embodiment, the X time sub-pool(s) comprises (comprise) all defer durations and all additional slot durations in FIG. 16.

In one embodiment, the X time sub-pool(s) comprises (comprise) all defer durations and part of additional slot durations in FIG. 16.

In one embodiment, the X time sub-pool(s) comprises (comprise) all defer durations, all additional slot durations and all additional defer durations in FIG. 16.

In one embodiment, the X time sub-pool(s) comprises (comprise) all defer durations, part of additional slot durations and all additional defer durations in FIG. 16.

In one embodiment, the X time sub-pool(s) comprises (comprise) all defer durations, part of additional slot durations and part of additional defer durations in FIG. 16.

In one embodiment, any of the X time sub-pool(s) lasts either 16 μs or 9 μs.

In one embodiment, any slot duration in a given time duration is one of the X time sub-pool(s); the given time duration is any duration among all defer durations, all additional slot durations and all additional defer durations comprised in FIG. 16.

In one embodiment, performing energy detection in a given time duration means performing energy detection in all slot durations within the given time duration; the given time duration is any duration among all defer durations, all additional slot durations and all additional defer durations comprised in FIG. 16.

In one embodiment, a given time duration being determined to be idle through energy detection means that each slot durations comprised in the given time duration is determined as idle through energy detection; the given time duration is any duration among all defer durations, all additional slot durations and all additional defer durations comprised in FIG. 16.

In one embodiment, a given slot duration being determined to be idle through energy detection means that the base station senses power of all radio signals in the given frequency sub-band in a given time unit and then averages in time, from which a received power obtained is lower than the first reference threshold; the given time unit is a consecutive duration in the given slot duration.

In one subembodiment of the above embodiment, the given time unit lasts no shorter than 4 μs.

In one embodiment, a given slot duration being determined to be idle through energy detection means that the base station senses energy of all radio signals in the given frequency sub-band in a given time unit and then averages in time, from which a received energy obtained is lower than the first reference threshold; the given time unit is a consecutive duration in the given slot duration.

In one subembodiment of the above embodiment, the given time unit lasts no shorter than 4 μs.

In one embodiment, performing energy detection in a given time duration means performing energy detection in (all) time sub-pool(s) within the given time duration; the given time duration is any duration among all defer durations, all additional slot durations and all additional defer durations comprised in FIG. 16, and the time sub-pool belongs to the X time sub-pool(s).

In one embodiment, a given time duration being determined to be idle through energy detection means that each of detection value(s) obtained through energy detection on (all) time sub-pool(s) comprised in the given time duration is lower than the first reference threshold; the given time duration is any duration among all defer durations, all additional slot durations and all additional defer durations comprised in FIG. 16, the time sub-pool belongs to the X time sub-pool(s), and each of the detection value(s) belongs to the X detection value(s).

In one embodiment, a defer duration lasts as long as (16+Y1*9) μs, Y1 being a positive integer.

In one subembodiment, a defer duration comprises Y1+1 time sub-pools of the X time sub-pools.

In one reference embodiment of the above subembodiment, a first time sub-pool of the Y1+1 time sub-pools lasts 16 μs, while each of the other Y1 time sub-pool(s) lasts 9 μs.

In one subembodiment, the given priority class is used for determining the Y1.

In one reference embodiment of the above subembodiment, the given priority class refers to Channel Access Priority Class, for the definition of the Channel Access Priority Class, refer to 3GPP TS36.213, section 15.

In one subembodiment of the above embodiment, the Y1 is one of 1, 2, 3 and 7.

In one embodiment, a defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by 7 ms.

In one embodiment, an additional defer duration lasts as long as 16 μs+Y2*9 μs, Y2 being a positive integer.

In one subembodiment, an additional defer duration comprises Y2+1 time sub-pools of the X time sub-pools.

In one reference embodiment of the above subembodiment, a first time sub-pool of the Y2+1 time sub-pools lasts 16 μs, while each of the other Y2 time sub-pool(s) lasts 9 μs.

In one subembodiment, the given priority class is used for determining the Y2.

In one subembodiment of the above embodiment, the Y2 is one of 1, 2, 3 and 7.

In one embodiment, a defer duration lasts as long as an additional defer duration.

In one embodiment, the Y1 is equal to the Y2.

In one embodiment, an additional defer duration comprises multiple slot durations.

In one subembodiment, a first slot duration and a second slot duration of the multiple slot durations are non-consecutive.

In one subembodiment, a first slot duration and a second slot duration of the multiple slot durations are spaced by 7 ms.

In one embodiment, a slot duration lasts 9 μs.

In one embodiment, a slot duration is one of the X time sub-pool(s).

In one embodiment, an additional slot duration lasts 9 μs.

In one embodiment, an additional slot duration comprises one of the X time sub-pool(s).

In one embodiment, the X energy detection(s) is(are) used for determining whether the given frequency sub-band is idle.

In one embodiment, the X energy detection(s) is(are) used for determining whether the given frequency sub-band can be used by the base station for transmitting (a) radio signal (s).

In one embodiment, the X detection value(s) is(are) measured by dBm.

In one embodiment, the X detection value(s) is(are) measured by mW.

In one embodiment, the X detection value(s) is(are) measured by Joule.

In one embodiment, the X1 is less than the X.

In one embodiment, the X is greater than 1.

In one embodiment, the first reference threshold is measured by dBm.

In one embodiment, the first reference threshold is measured by mW.

In one embodiment, the first reference threshold is measured by Joule (J).

In one embodiment, the first reference threshold is equal to or less than −72 dBm.

In one embodiment, the first reference threshold is any value equal to or less than a first given value.

In one subembodiment of the above embodiment, the first given value is pre-defined.

In one subembodiment of the above embodiment, the first given value is configured by a higher layer signaling.

In one embodiment, the first reference threshold is liberally selected by the base station given that the first reference threshold is equal to or less than a first given value.

In one subembodiment of the above embodiment, the first given value is pre-defined.

In one subembodiment of the above embodiment, the first given value is configured by a higher layer signaling.

In one embodiment, the X energy detection(s) is(are) energy detection(s) in a process of Cat 4 Listen Before Talk (LBT), the X1 refers to CWp in the process of Cat 4 LBT, and the CWp refers to contention window size, for the detailed definition of the CWp, refer to 3 GPP TS36.213, section 15.

In one embodiment, among detection value(s) of the X detection values not belonging to the X1 detection value(s) there is at least one detection value lower than the first reference threshold.

In one embodiment, among detection value(s) of the X detection values not belonging to the X1 detection value(s) there is at least one detection value no lower than the first reference threshold.

In one embodiment, any two of the X1 time sub-pools are of equal duration.

In one embodiment, at least two of the X1 time sub-pools are of unequal durations.

In one embodiment, the X1 time sub-pool(s) comprises (comprise) a latest time sub-pool of the X time sub-pools.

In one embodiment, the X1 time sub-pool(s) comprises (comprise) only slot duration(s) comprised in an eCCA.

In one embodiment, the X time sub-pools comprise the X1 time sub-pool(s) and X2 time sub-pool(s), any of the X2 time sub-pool(s) not belonging to the X1 time sub-pool(s); X2 is a positive integer no greater than the X minus the X1.

In one subembodiment, the X2 time sub-pool(s) comprises(comprise) slot duration(s) comprised in an initial CCA.

In one subembodiment, positions of the X2 time sub-pools among the X time sub-pools are consecutive.

In one subembodiment, at least one time sub-pool of the X2 time sub-pool(s) corresponds to a detection value lower than the first reference threshold.

In one subembodiment, at least one time sub-pool of the X2 time sub-pool(s) corresponds to a detection value no lower than the first reference threshold.

In one subembodiment, the X2 time sub-pool(s) comprises(comprise) all slot durations within each defer duration.

In one subembodiment, the X2 time sub-pool(s) comprises(comprise) all slot durations within at least one additional defer duration.

In one subembodiment, the X2 time sub-pool(s) comprises(comprise) at least one additional slot duration.

In one subembodiment, the X2 time sub-pool(s) comprises(comprise) all slot durations within additional slot duration(s) and additional defer duration(s) in FIG. 16 determined to be non-idle through energy detection.

In one embodiment, the X1 time sub-pool(s) respectively belongs(belong) to X1 sub-pool set(s), of which any sub-pool set comprises a positive integer number of time sub-pool(s); any time sub-pool out of the X1 sub-pool set(s) corresponds to a detection value lower than the first reference threshold.

In one subembodiment, at least one sub-pool set of the X1 sub-pool set(s) comprises one time sub-pool.

In one subembodiment, at least one sub-pool set of the X1 sub-pool set(s) comprises more than one time sub-pool.

In one subembodiment, at least two sub-pool sets of the X1 sub-pool sets comprise unequal numbers of time sub-pools.

In one subembodiment, no time sub-pool out of the X time sub-pool(s) belongs to two of the X1 sub-pool sets simultaneously.

In one subembodiment, all time sub-pools comprised in any of the X1 sub-pool set(s) belong to a same additional defer duration or additional slot duration determined to be idle through energy detection.

In one subembodiment, among time sub-pool(s) of the X time sub-pools not belonging to the X1 sub-pool set(s) at least one time sub-pool corresponds to a detection value lower than the first reference threshold.

In one subembodiment, among time sub-pool(s) of the X time sub-pools not belonging to the X1 sub-pool set(s) at least one time sub-pool corresponds to a detection value no lower than the first reference threshold.

Embodiment 17

Figure 17:
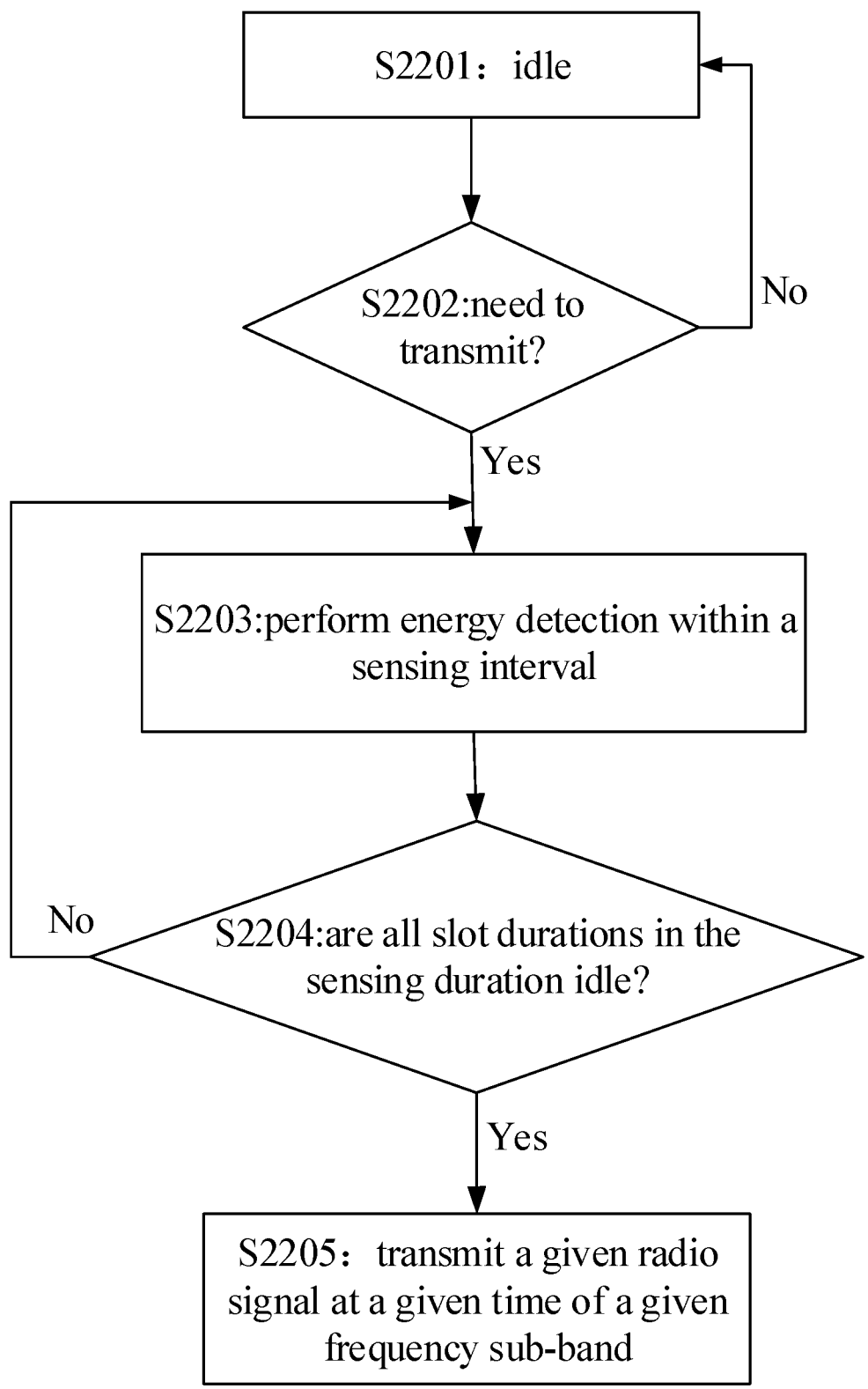
FIG. 17 illustrates a schematic diagram of a given access detection performed on a given frequency sub-band being used to determine whether a given radio signal starts to be transmitted at a given time of the given frequency sub-band according to another embodiment of the present disclosure.

Embodiment 17 illustrates another schematic diagram of a given access detection performed on a given frequency sub-band being used to determine whether a given radio signal starts to be transmitted at a given time of the given frequency sub-band, as shown in FIG. 17.

In Embodiment 17, the given access detection comprises performing Y energy detection(s) respectively in Y time sub-pool(s) of the given frequency sub-band to obtain Y detection value(s), Y being a positive integer; an end time for the Y time sub-pool(s) is no later than the given time. The given access detection corresponds to the first access detection in the present disclosure, the given time corresponds to the start time for the transmission of the first radio signal in the present disclosure, and the given frequency sub-band corresponds to the first frequency sub-band in the present disclosure, and the Y corresponds to the Q in the present disclosure. The process of the given access detection can be depicted by the flowchart of FIG. 17.

In Embodiment 17, the UE in the present disclosure is idle in step S2201, and determines whether there is need to transmit in step S2202; performs energy detection in a sensing interval in step S2203; and determines in step S2204 whether all slot durations within the sensing interval are idle, if yes, move forward to step S2205 to transmit a radio signal in the first frequency sub-band; otherwise, go back to step S2203.

In Embodiment 17, a first given duration comprises a positive integer number of time sub-pool(s) out of the Y time sub-pool(s), and the first given duration is any duration in all sensing intervals comprised by FIG. 17. A second given duration comprises one of the Y1 time sub-pool(s), and the second given duration is a sensing interval in FIG. 17 determined to be idle through energy detection. The Y1 corresponds to the Q1 in the present disclosure.

In one embodiment, the detailed definition of the sensing interval can be found in 3GPP TS36.213, section 15.2.

In one embodiment, the Y1 is equal to 2.

In one embodiment, the Y1 is equal to the Y.

In one embodiment, a sensing interval lasts 25 μs.

In one embodiment, a sensing interval comprises 2 slot durations, and the 2 slot durations are non-consecutive in time domain.

In one subembodiment of the above embodiment, a time interval between the 2 slot durations is 7 μs.

In one embodiment, the Y time sub-pool(s) comprises (comprise) listening time in Category 2 LBT.

In one embodiment, the Y time sub-pool(s) comprises (comprise) slots comprised by a sensing interval in Type 2 UL channel access procedure, for the detailed definition of the sensing interval, refer to 3GPP TS36.213, section 15.2.

In one subembodiment of the above embodiment, the sensing interval lasts 25 μs.

In one embodiment, the Y time sub-pool(s) comprises (comprise) Tf and Tsl comprised by a sensing interval in Type 2 UL channel access procedure, for the detailed definition of the Tf and the Tsl, refer to 3GPP TS36.213, section 15.2.

In one subembodiment of the above embodiment, the Tf lasts 16 μs.

In one subembodiment of the above embodiment, the Tsl lasts 9 μs.

In one embodiment, a first time sub-pool of the Y1 time sub-pools lasts 16 μs, and a second time sub-pool of the Y1 time sub-pools lasts 9 μs, the Y1 being equal to 2.

In one embodiment, each of the Y1 time sub-pools lasts 9 μs; a time interval between a first time sub-pool and a second time sub-pool out of the Y1 time sub-pools is 7 μs, the Y1 being equal to 2.

Embodiment 18

Figure 18:
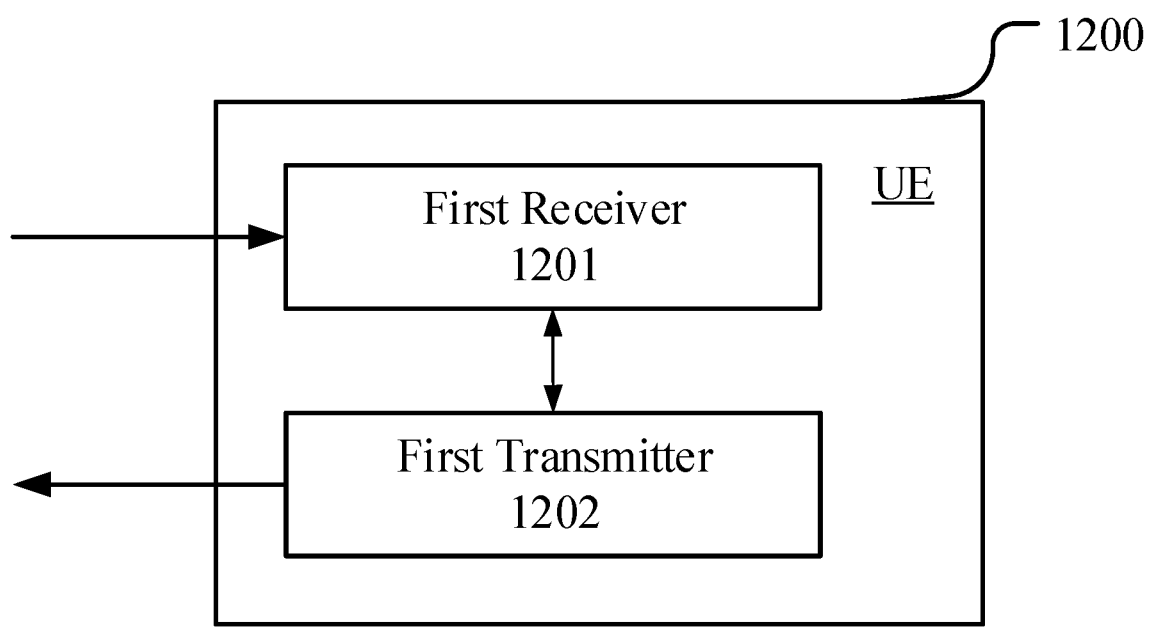
FIG. 18 illustrates a structure block diagram of a processing device in a UE according to one embodiment of the present disclosure.

Embodiment 18 illustrates a structure block diagram of a processing device in a UE, as shown in FIG. 18. In FIG. 18, a UE's processing device 1200 comprises a first receiver 1201 and a first transmitter 1202.

In one embodiment, the first receiver 1201 comprises the receiver 456, the receiving processor 452 and the controller/processor 490 in Embodiment 4.

In one embodiment, the first receiver 1201 comprises at least the first two of the receiver 456, the receiving processor 452 and the controller/processor 490 in Embodiment 4.

In one embodiment, the first transmitter 1202 comprises the transmitter 456, the transmitting processor 455 and the controller/processor 490 in Embodiment 4.

In one embodiment, the first transmitter 1202 comprises at least the first two of the transmitter 456, the transmitting processor 455 and the controller/processor 490 in Embodiment 4.

The first receiver 1201 receives first information; and the first transmitter 1202 transmits a first radio signal in a first time window in a first frequency sub-band.

In Embodiment 18, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

In one embodiment, the W start time(s) comprises(comprise) start time(s) respectively corresponding to N1 time unit(s) out of the N time units, N1 being related to the SCS of the subcarriers occupied by the first radio signal, and N1 being a positive integer no greater than the N.

In one embodiment, the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively, or, there are two start times respectively belonging to two of the M subsets and also to a same time unit of the N time units.

In one embodiment, a first subset is any subset of the M subsets that comprises more than one start time, and a time offset between any two start times in the first subset is equal to a positive integral multiple of a first time offset.

In one embodiment, the first transmitter 1202 also transmits second information; herein, the second information is used for indicating one of the N time units to which the start time for the transmission of the first radio signal belongs.

In one embodiment, a number of bits comprised in the second information is related to the SCS of the subcarriers occupied by the first radio signal.

In one embodiment, the first receiver 1201 also performs a first access detection in the first frequency sub-band; herein, the first access detection is used for determining that the first radio signal is to be transmitted in the first time window in the first frequency sub-band.

Embodiment 19

Figure 19:
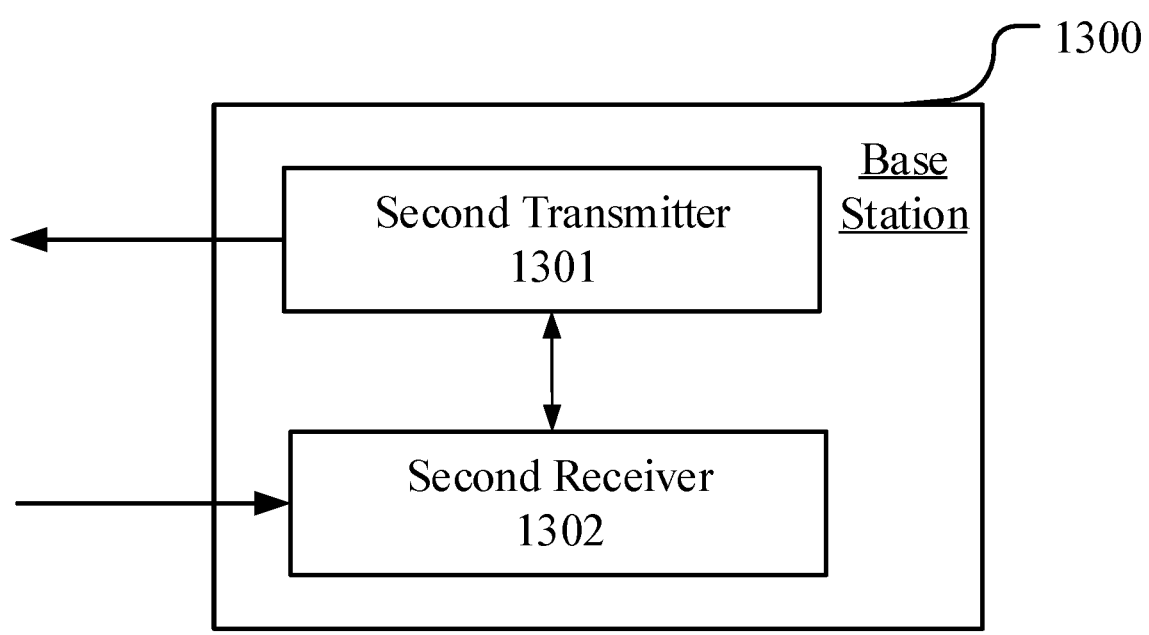
FIG. 19 illustrates a structure block diagram of a processing device in a base station according to one embodiment of the present disclosure.

Embodiment 19 illustrates a structure block diagram of a processing device in a base station, as shown in FIG. 19. In FIG. 19, a base station's processing device 1300 comprises a second transmitter 1301 and a second receiver 1302.

In one embodiment, the second transmitter 1301 comprises the transmitter 416, the transmitting processor 415 and the controller/processor 440 in Embodiment 4.

In one embodiment, the second transmitter 1301 comprises at least the first two of the transmitter 416, the transmitting processor 415 and the controller/processor 440 in Embodiment 4.

In one embodiment, the second receiver 1302 comprises the receiver 416, the receiving processor 412 and the controller/processor 440 in Embodiment 4.

In one embodiment, the second receiver 1302 comprises at least the first two of the receiver 416, the receiving processor 412 and the controller/processor 440 in Embodiment 4.

The second transmitter 1301 transmits first information; and the second receiver 1302 receives a first radio signal in a first time window in a first frequency sub-band.

In Embodiment 19, the first information is used for determining the first time window; a time offset of a start time for a transmission of the first radio signal relative to a reference time belongs to a target offset set, and the target offset set comprises W offset value(s), W being a positive integer; time offset(s) of W start time(s) respectively relative to the reference time is(are) respectively equal to the W offset value(s); any start time of the W start time(s) belongs to one of N time units, and any of the N time units comprises at least one of the W start time(s), any two time units of the N time units are orthogonal, each of the N time units belongs to the first time window, and a duration of each of the N time units is related to a subcarrier spacing (SCS) of subcarriers occupied by the first radio signal; at least one of the N or the target offset set is related to the SCS of the subcarriers occupied by the first radio signal.

In one embodiment, S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

In one embodiment, the W start time(s) comprises(comprise) start time(s) of each of N1 time unit(s) out of the N time units, N1 being related to the SCS of the subcarriers occupied by the first radio signal, and N1 being a positive integer no greater than the N.

In one embodiment, the W start times are divided into M subsets, any start time of the W start times belongs to one of the M subsets, and any of the M subsets comprises at least one start time of the W start times, M being a positive integer; start time(s) respectively corresponding to the N1 time unit(s) respectively belongs(belong) to N1 subset(s) of the M subsets, the N1 being no greater than the M; the M is equal to the N and start times respectively comprised by the M subsets belong to the N time units respectively, or, there are two start times respectively belonging to two of the M subsets and also to a same time unit of the N time units.

In one embodiment, a first subset is any subset of the M subsets that comprises more than one start time, and a time offset between any two start times in the first subset is equal to a positive integral multiple of a first time offset.

In one embodiment, the second receiver 1302 also receives second information; herein, the second information is used for indicating one of the N time units to which the start time for the transmission of the first radio signal belongs.

In one embodiment, a number of bits comprised in the second information is related to the SCS of the subcarriers occupied by the first radio signal.

In one embodiment, the second receiver 1302 monitors whether the first radio signal is transmitted in the first time window in the first frequency sub-band; herein, a receiver of the first information performs a first access detection in the first frequency sub-band to determine that the first radio signal is to be transmitted in the first time window in the first frequency sub-band.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (TOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communications, comprising:
   a first receiver, receiving first information; and
   a first transmitter, transmitting a first radio signal in a first time window in a first frequency sub-band;
   wherein the first information is used for determining the first time window; a time offset of a start time for a transmission of the first radio signal relative to a reference time belongs to a target offset set, and the target offset set comprises W offset values, W being a positive integer; time offsets of W start times respectively relative to the reference time are respectively equal to the W offset values; any start time of the W start times belongs to one of N time units, N being a positive integer, and any of the N time units comprises at least one of the W start times, any two of the N time units are orthogonal, each of the N time units belongs to the first time window, and a duration of each of the N time units is related to a subcarrier spacing (SCS) of subcarriers occupied by the first radio signal; only one between the N and the target offset set is related to the SCS of the subcarriers occupied by the first radio signal;
   wherein between the N and the target offset set only the target offset set is related to the SCS of the subcarriers occupied by the first radio signal; S SCSs respectively correspond to S offset sets, any two of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

2. The UE according to claim 1, wherein the W start times comprise start time(s) respectively corresponding to N1 time unit(s) out of the N time units, N1 being a positive integer no greater than the N; the N1 is related to the SCS of the subcarriers occupied by the first radio signal, or is unrelated to the SCS of the subcarriers occupied by the first radio signal.

3. The UE according to claim 2, wherein the W start times are divided into M subsets, any start time of the W start times belongs to one of the M subsets, and any of the M subsets comprises at least one start time of the W start times, M being a positive integer; the start time corresponding to the N1 time unit belongs to N1 subset of the M subsets with the N1 being equal to 1, or, the start times respectively corresponding to the N1 time units respectively belong to N1 subsets of the M subsets; with the N1 being greater than 1 and being no greater than the M; the M is equal to the N and start times respectively comprised by the M subsets belong to the N time units respectively, or, there are two start times respectively belonging to two of the M subsets and also to a same time unit of the N time units; a first subset is any subset of the M subsets that comprises more than one start time, and a time offset between any two start times in the first subset is equal to a positive integral multiple of a first time offset.

4. The UE according to claim 1, wherein the first transmitter also transmits second information; herein, the second information is used for indicating a time unit of the N time units to which the start time for the transmission of the first radio signal belongs.

5. The UE according to claim 1, wherein the first receiver also performs a first access detection in the first frequency sub-band; herein, the first access detection is used for determining that the first radio signal is to be transmitted in the first time window in the first frequency sub-band.

6. A base station for wireless communications, comprising:
   a second transmitter, transmitting first information; and
   a second receiver, receiving a first radio signal in a first time window in a first frequency sub-band;
   wherein the first information is used for determining the first time window; a time offset of a start time for a transmission of the first radio signal relative to a reference time belongs to a target offset set, and the target offset set comprises W offset values, W being a positive integer; time offsets of W start times respectively relative to the reference time are respectively equal to the W offset values; any start time of the W start times belongs to one of N time units, N being a positive integer, and any of the N time units comprises at least one of the W start times, any two of the N time units are orthogonal, each of the N time units belongs to the first time window, and a duration of each of the N time units is related to a subcarrier spacing (SCS) of subcarriers occupied by the first radio signal; only one between the N and the target offset set is related to the SCS of the subcarriers occupied by the first radio signal;
   wherein between the N and the target offset set only the target offset set is related to the SCS of the subcarriers occupied by the first radio signal; S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

7. The base station according to claim 6, wherein the W start times comprise start time(s) respectively corresponding to N1 time unit(s) out of the N time units, N1 being a positive integer no greater than the N; N1 is related to the SCS of the subcarriers occupied by the first radio signal, or is unrelated to the SCS of the subcarriers occupied by the first radio signal.

8. The base station according to claim 7, wherein the W start times are divided into M subsets, any start time of the W start times belongs to one of the M subsets, and any of the M subsets comprises at least one start time of the W start times, M being a positive integer; the start time corresponding to the N1 time unit belongs to N1 subset of the M subsets with the N1 being equal to 1, or, the start times respectively corresponding to the N1 time units respectively belong to N1 subsets of the M subsets; with the N1 being greater than 1 and being no greater than the M; the M is equal to the N and start times respectively comprised by the M subsets belong to the N time units respectively, or, there are two start times respectively belonging to two of the M subsets and also to a same time unit of the N time units; a first subset is any subset of the M subsets that comprises more than one start time, and a time offset between any two start times in the first subset is equal to a positive integral multiple of a first time offset.

9. The base station according to claim 6, wherein the second receiver also receives second information; herein, the second information is used for indicating a time unit of the N time units to which the start time for the transmission of the first radio signal belongs.

10. A method in a UE for wireless communications, comprising:
receiving first information; and
transmitting a first radio signal in a first time window in a first frequency sub-band;
wherein the first information is used for determining the first time window; a time offset of a start time for a transmission of the first radio signal relative to a reference time belongs to a target offset set, and the target offset set comprises W offset values, W being a positive integer; time offsets of W start times respectively relative to the reference time are respectively equal to the W offset values; any start time of the W start times belongs to one of N time units, N being a positive integer, and any of the N time units comprises at least one of the W start times, any two of the N time units are orthogonal, each of the N time units belongs to the first time window, and a duration of each of the N time units is related to a subcarrier spacing (SCS) of subcarriers occupied by the first radio signal; only one between the N and the target offset set is related to the SCS of the subcarriers occupied by the first radio signal;
wherein between the N and the target offset set only the target offset set is related to the SCS of the subcarriers occupied by the first radio signal; S SCSs respectively correspond to S offset sets, any two SCSs of the S SCSs being different, the SCS of the subcarriers occupied by the first radio signal is one of the S SCSs, and the target offset set is one of the S offset sets that corresponds to the SCS of the subcarriers occupied by the first radio signal, S being a positive integer greater than 1.

11. The method according to claim 10, wherein the W start times comprise start time(s) respectively corresponding to N1 time unit(s) out of the N time units, N1 being a positive integer no greater than the N; the N1 is related to the SCS of the subcarriers occupied by the first radio signal, or is unrelated to the SCS of the subcarriers occupied by the first radio signal.

12. The method according to claim 11, wherein the W start times are divided into M subsets, any start time of the W start times belongs to one of the M subsets, and any of the M subsets comprises at least one start time of the W start times, M being a positive integer; the start time corresponding to the N1 time unit belongs to N1 subset of the M subsets with the N1 being equal to 1, or, the start times respectively corresponding to the N1 time units respectively belong to N1 subsets of the M subsets; with the N1 being greater than 1 and being no greater than the M; the M is equal to the N and start times respectively comprised by the M subsets belong to the N time units respectively, or, there are two start times respectively belonging to two of the M subsets and also to a same time unit of the N time units; a first subset is any subset of the M subsets that comprises more than one start time, and a time offset between any two start times in the first subset is equal to a positive integral multiple of a first time offset.

13. The method according to claim 10, comprising:
transmitting second information;
wherein the second information is used for indicating a time unit of the N time units to which the start time for the transmission of the first radio signal belongs.

14. The method according to claim 10, comprising:
performing a first access detection in the first frequency sub-band;
wherein the first access detection is used for determining that the first radio signal is to be transmitted in the first time window in the first frequency sub-band.

* * * * *